(12) United States Patent
Le Blanc

(10) Patent No.: US 11,536,459 B2
(45) Date of Patent: Dec. 27, 2022

(54) ELECTRIC COOKTOP SAFETY SYSTEM

(71) Applicant: Eric Le Blanc, Murrieta, CA (US)

(72) Inventor: Eric Le Blanc, Murrieta, CA (US)

(73) Assignee: Eric Le Blanc, Murrieta, CA (US)

( * ) Notice: Subject to any disclaimer, the term of this patent is extended or adjusted under 35 U.S.C. 154(b) by 0 days.

(21) Appl. No.: 17/395,117

(22) Filed: Aug. 5, 2021

(65) Prior Publication Data
US 2021/0364167 A1 Nov. 25, 2021

Related U.S. Application Data

(63) Continuation-in-part of application No. 16/872,011, filed on May 11, 2020, now Pat. No. 11,168,891, which is a continuation-in-part of application No. 16/847,366, filed on Apr. 13, 2020, now abandoned.

(51) Int. Cl.
*F24C 7/08* (2006.01)
*F16B 3/00* (2006.01)
*F24C 15/10* (2006.01)

(52) U.S. Cl.
CPC ............ *F24C 7/083* (2013.01); *F16B 3/00* (2013.01); *F24C 15/107* (2013.01)

(58) Field of Classification Search
CPC ..... A47J 36/34; A47G 23/0683; F24C 15/107
USPC ...................................... 248/176.2; 220/630
See application file for complete search history.

(56) References Cited

U.S. PATENT DOCUMENTS

| | | | | |
|---|---|---|---|---|
| 3,198,189 A * | 8/1965 | Arthur | ............. | A47J 36/34 126/211 |
| 3,313,919 A * | 4/1967 | Richardson | ............. | H05B 3/68 219/465.1 |
| 3,372,688 A * | 3/1968 | Moore | ............. | F24C 15/107 126/24 |
| 5,474,206 A * | 12/1995 | Herring, Sr. | ............. | A47J 43/0727 220/636 |
| 5,743,045 A * | 4/1998 | Hicks | ............. | A01G 9/04 47/71 |
| 8,297,272 B2 * | 10/2012 | Williams | ............. | F24C 15/36 126/50 |
| 8,561,957 B2 * | 10/2013 | Levine | ............. | A47J 36/34 220/573.1 |
| 2009/0090345 A1 * | 4/2009 | Reischmann | ............. | F24C 15/36 126/24 |
| 2018/0303267 A1 * | 10/2018 | Le Blanc | ............. | A47J 36/34 |
| 2021/0315417 A1 * | 10/2021 | Le Blanc | ............. | A47G 23/0683 |

* cited by examiner

*Primary Examiner* — Muhammad Ijaz
(74) *Attorney, Agent, or Firm* — Maschoff Brennan

(57) ABSTRACT

The present disclosure relates to an electric cooktop safety system. More particularly, the electric cooktop safety system pertains to safety cookware vessels having special fastening components that secure these safety cookware vessels to an electric cooktop, preventing a user from accidentally tipping or pulling off the safety cookware vessels from the electric cooktop. In one implementation, the fastening components may include a safety stem having keyed members and stem locking members disposed on a safety cooktop to secure the safety cookware vessel to the safety cooktop. In another implementation, the fastening components may include electro-magnetic fastening components to secure the safety cookware vessel to the safety cooktop.

19 Claims, 28 Drawing Sheets

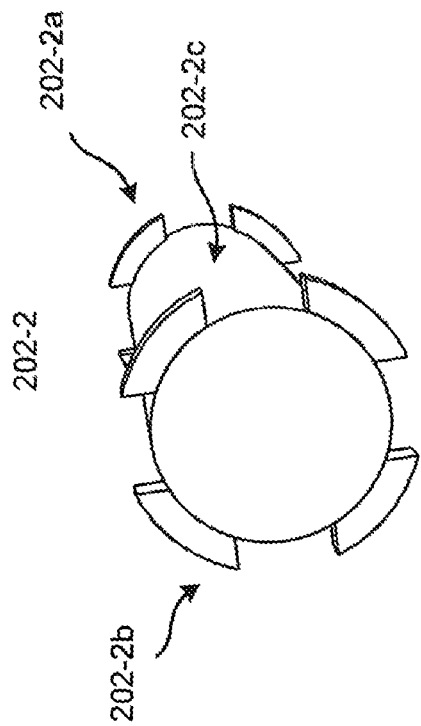
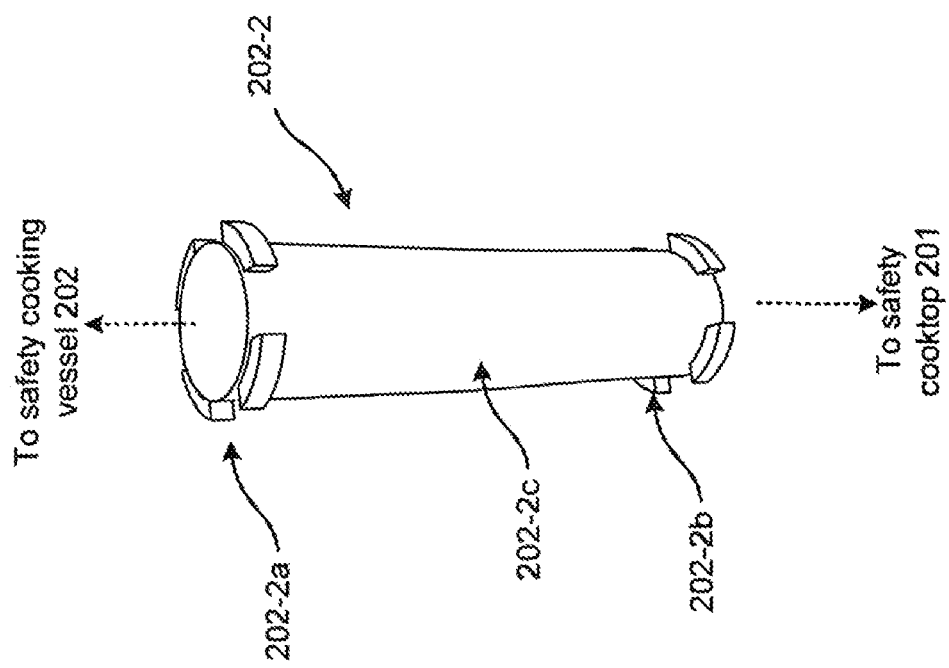
FIG. 10B
FIG. 10A

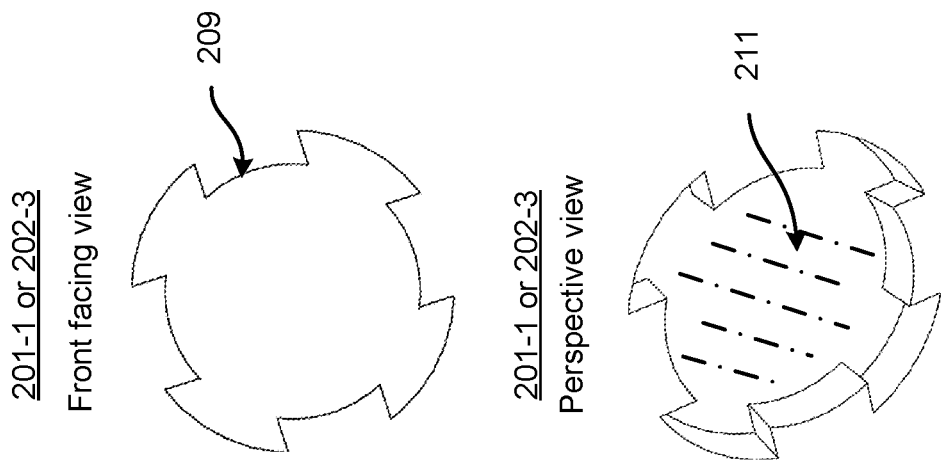
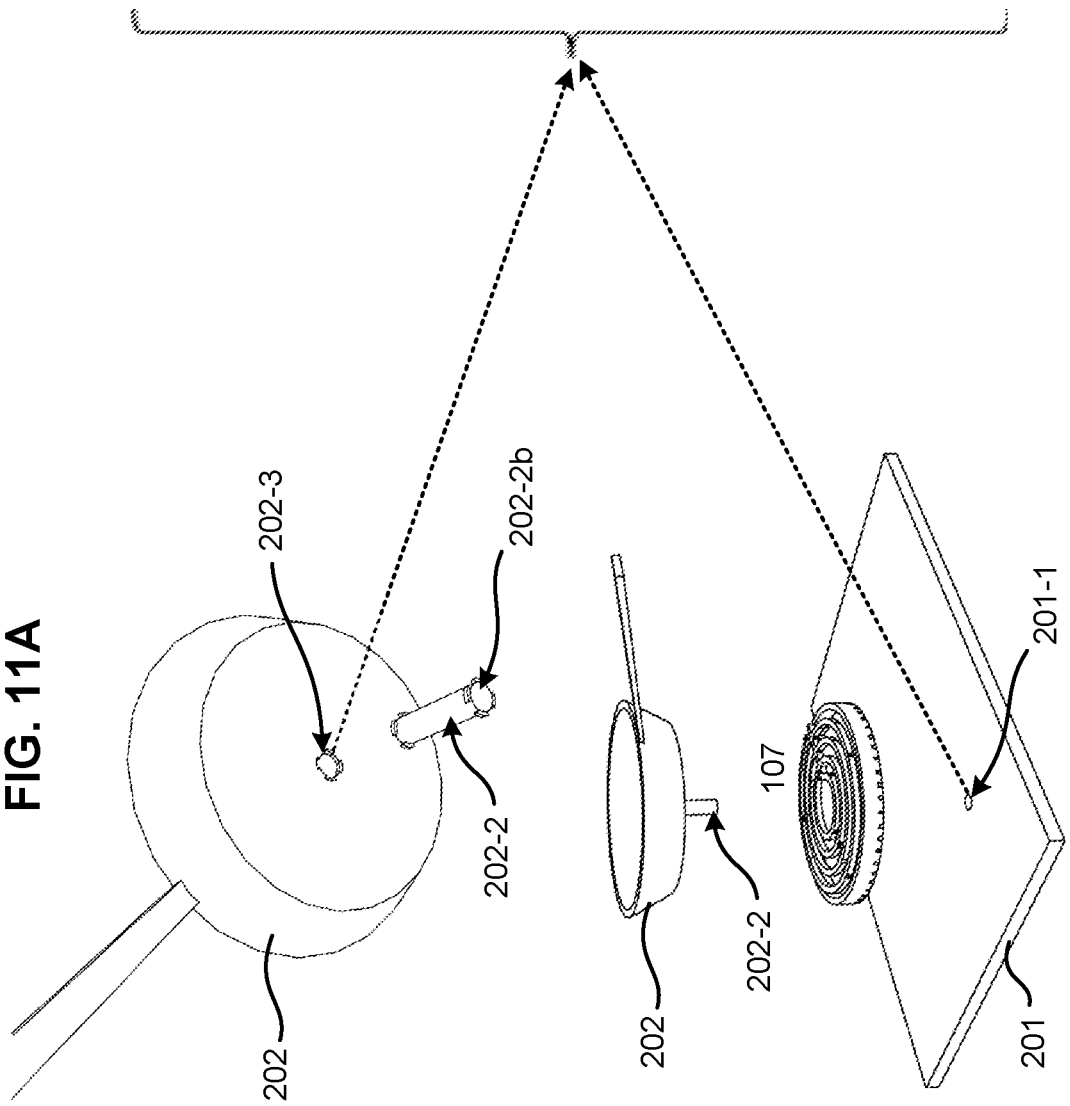
FIG. 11A
FIG. 11B

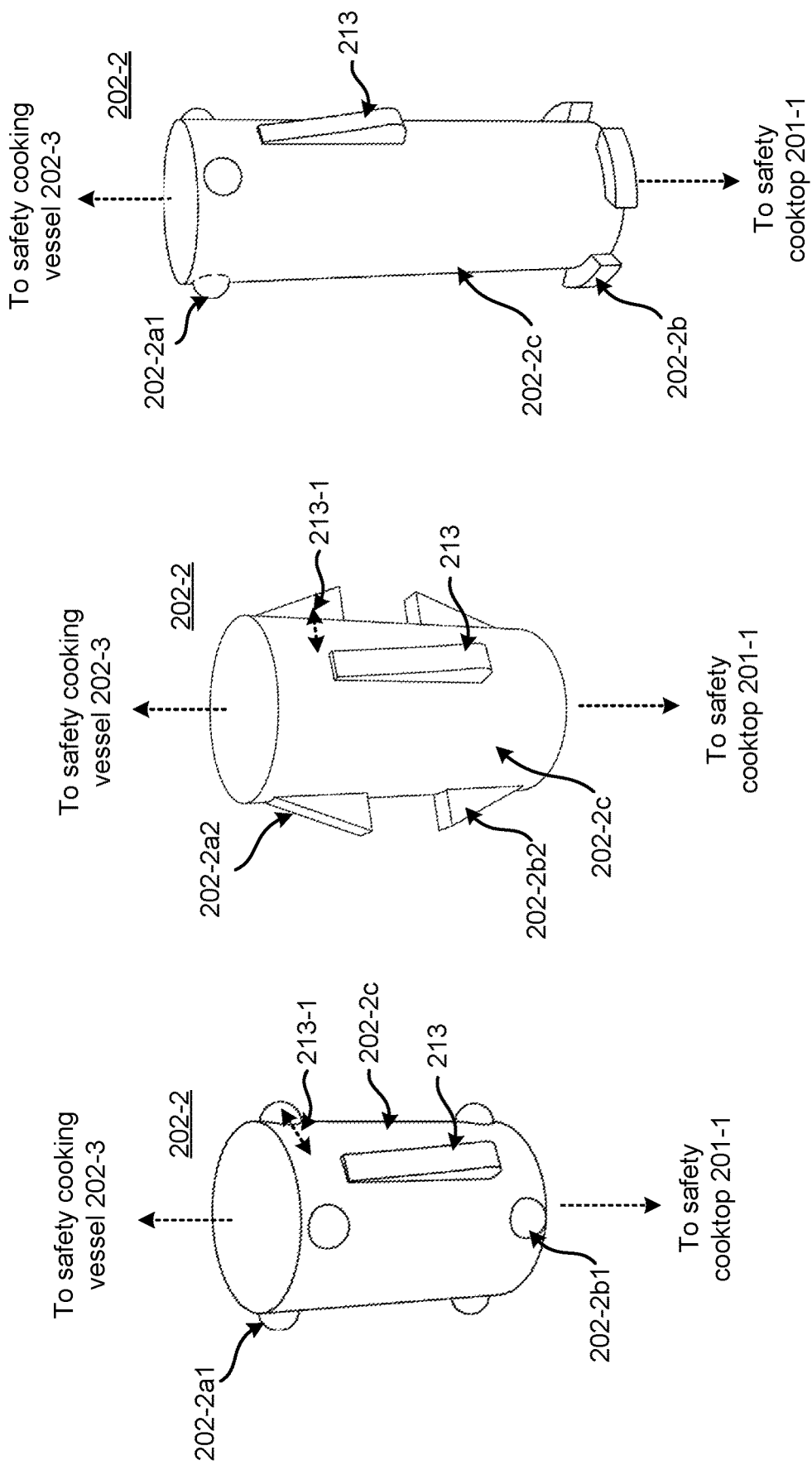

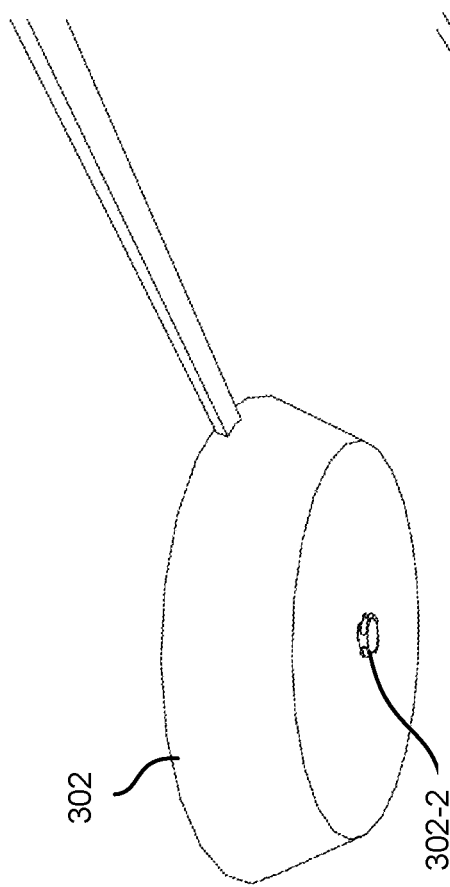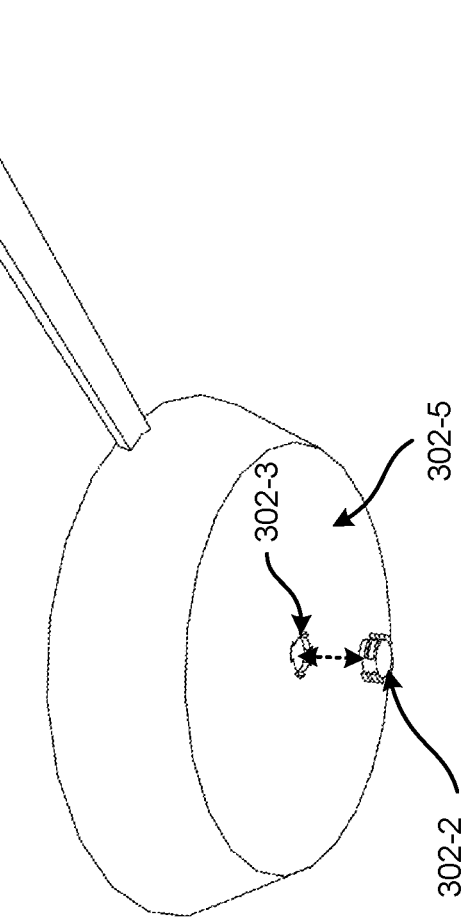

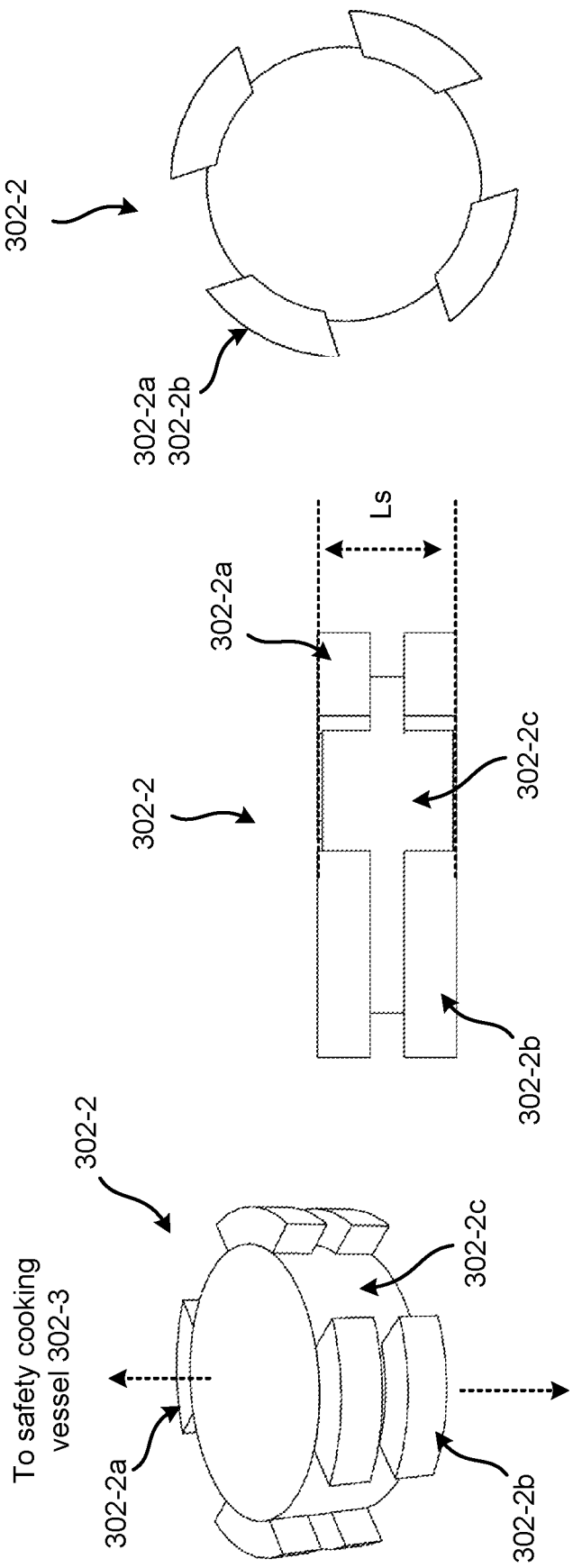

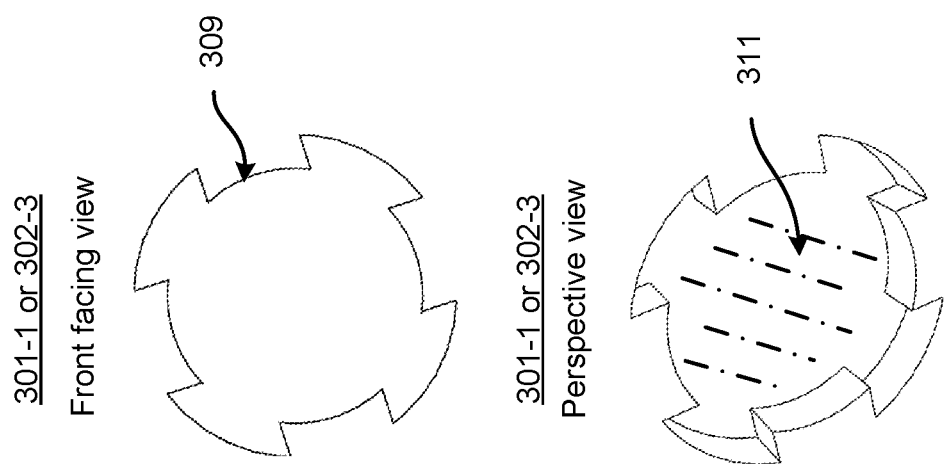
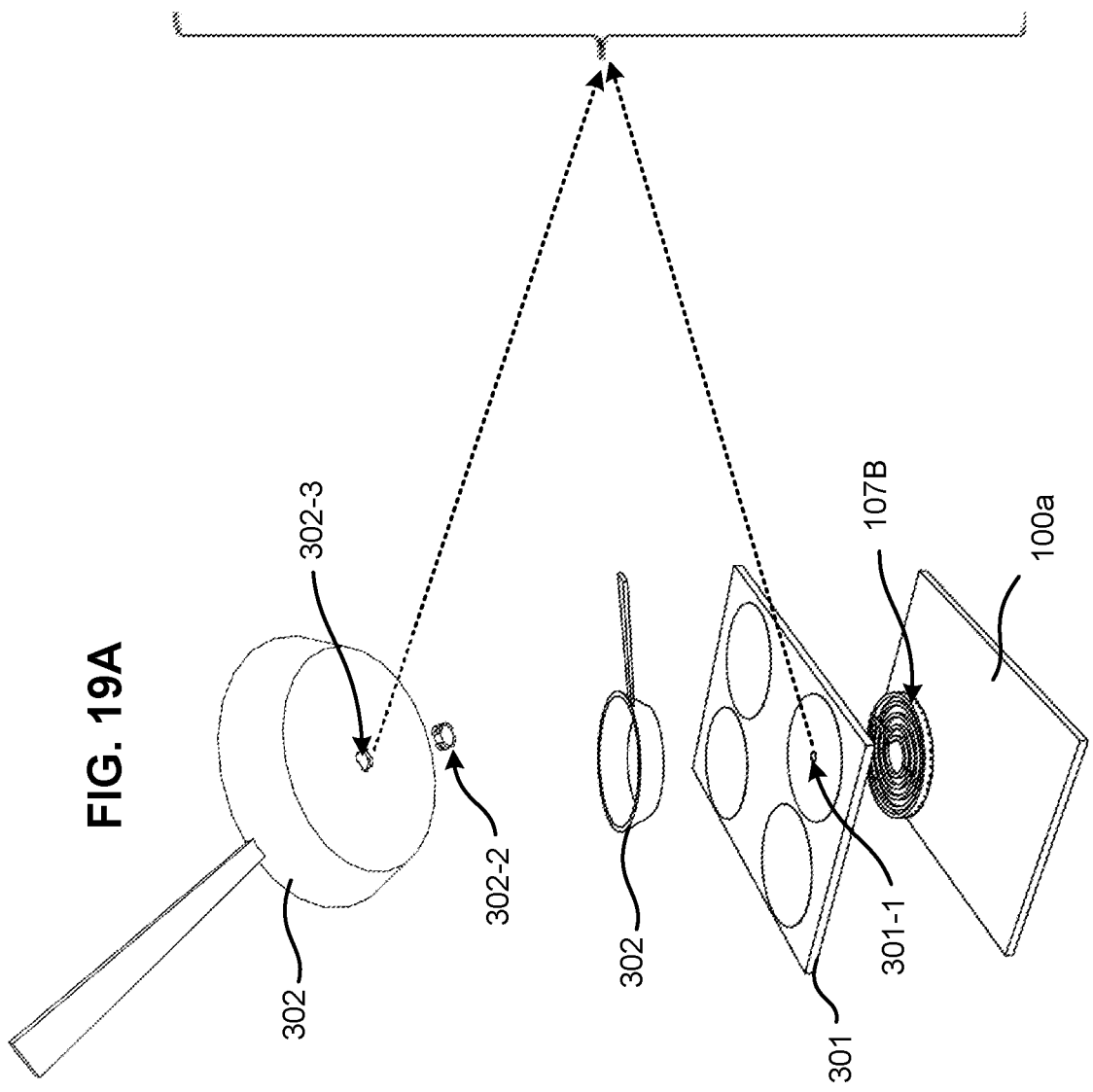

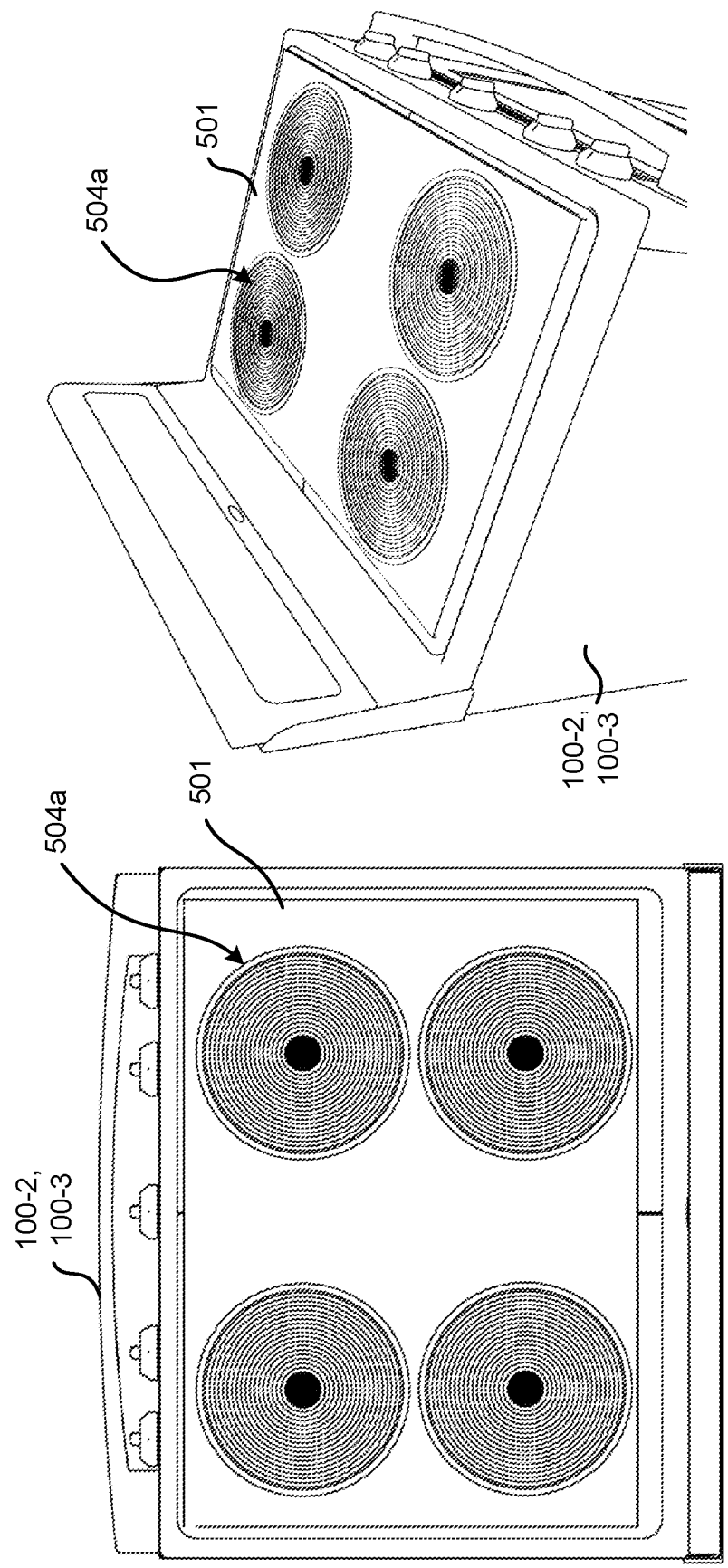

ELECTRIC COOKTOP SAFETY SYSTEM

RELATED APPLICATIONS

This application claims the benefit of priority of U.S. application Ser. No. 16/847,366 filed on Apr. 13, 2020 and U.S. application Ser. No. 16/872,011 filed on May 12, 2020, which are herein incorporated by reference to the present application.

FIELD OF THE DISCLOSURE

The present disclosure relates to an electric cooktop safety system. More particularly, the electric cooktop safety system pertains to safety cookware vessels (e.g., safety pots or pans) having special fastening components that secures these safety cookware vessels to an electric cooktop having safety features, preventing a user from accidentally tipping over or pulling off the safety cookware vessels from the electric cooktop.

BACKGROUND

Burn injuries to children and some adults in the United States which require medical attention are in the hundreds of thousands each year based on some burn statistics of children between 1-17 years old. A substantial number of these injuries are frequently related to scalds from spilled food such as, for example, when a person accidentally pulls a cooking vessel off of a cooktop.

Conventional gas ranges and cooktops are generally equipped with metal grates which are either mounted or seated on top of the cooktops, while electric ranges and cooktops have heating elements (calrods or coils) that are applied to the top or bottom portion of cooktops. The problem of accidentally tipping over pots or pans off the cooktop may occur in both types of cooktops (gas or electric) since the cooking vessel is free to move on the surface of the cooktop.

To prevent such injuries, some conventional cooktop safety devices are designed specifically for gas cooktops which retain, cover, or prevent access to the cooking vessels on gas ranges or cooktops. One example of a cooktop safety device includes a stove pot retainer having a retaining member contacting the sides of a cooking vessel to support the vessel in unstable conditions. In another example, the cooktop safety device may include lateral securing elements which are fixed onto the stove by means of suction cups, the lateral securing elements holding the pot or pan in place, making accidents less likely. In yet another example, the cooktop safety device may include a burner grate flame deflector having a plate-like member and a downwardly extending protective skirt for preventing flames or heat from heating a pot or pan handle.

Therefore, for electric cooktops, there is a need for a safety device and system that prevents accidentally tipping or pulling a cookware vessel off of the electric cooktop, thereby decreasing the risk of burn injuries or deaths to children and/or adults.

SUMMARY

One object of this disclosure is to provide an electric cooktop safety system including a safety cooking vessel having a safety stem coupled to a bottom portion of the safety cooking vessel. The safety stem may include a stem body, a first keyed member disposed along a first end of the stem body, and a second keyed member disposed along a second end of the stem body; and a safety cooktop having a bottom stem locking member disposed within a topside portion of the safety cooktop. Also, the second keyed member may be detachably coupled to the bottom stem locking member, preventing the safety cooking vessel from tipping over when the second keyed member is fastened to the bottom stem locking member.

Another object of this disclosure is to provide a safety cooking vessel for cooking food on an electric oven including a cooking body having at least a cookware surface, a bottom portion, and a handle, and a safety stem coupled to the bottom portion of the cooking body. The safety stem may include a stem body, a first keyed member disposed along a first end of the stem body, and a second keyed member disposed along a second end of the stem body. In addition, the second keyed member may engage with a bottom stem locking member disposed within a safety cooktop, preventing the safety cooking vessel from tipping over when the second keyed member is fastened to the bottom stem locking member.

It is yet another object of this disclosure is to provide a safety cooktop of an electric range for heating a safety cooking vessel having a stem body and a second keyed member disposed along a second end of the stem body, the safety cooktop may include a planar cooking surface disposed on a top portion of the electric range, and a bottom stem locking member disposed on a topside portion of the planar cooking surface. In addition, the bottom stem locking member may be configured to receive the second keyed member.

These and other objects, features and advantages of the present disclosure will become more apparent in light of the following detailed description of preferred embodiments thereof, as illustrated in the accompanying drawings.

BRIEF DESCRIPTION OF THE DRAWINGS

Although the characteristic features of this disclosure will be particularly pointed out in the claims, the disclosure itself and manner in which it may be made and used may be better understood after a review of the following description, taken in connection with the accompanying drawings wherein like numeral annotations are provided throughout.

FIG. 10A-FIG. 10B illustrate close-up and detailed view of the detachable safety stem, according to an embodiment.

FIG. 11A-FIG. 11B illustrate expanded and detailed view of the stem locking members, according to an embodiment.

FIG. 12A-FIG. 12C illustrate other design configurations of the detachable safety stem, according to an embodiment.

FIG. 17A-FIG. 17B illustrate a side view and a bottom-side perspective view of the safety cooking vessel and safety stem, according to an embodiment.

FIG. 18A-FIG. 18C illustrate close-up and detailed view of the detachable safety stem, according to an embodiment.

FIG. 19A-FIG. 19B illustrate expanded and detailed view of the stem locking members, according to an embodiment.

FIG. 27A-FIG. 27B illustrate a top view and a perspective view of the electro-magnetic core embedded into the cooktop, according to an embodiment.

DETAILED DESCRIPTION

Figure 1:
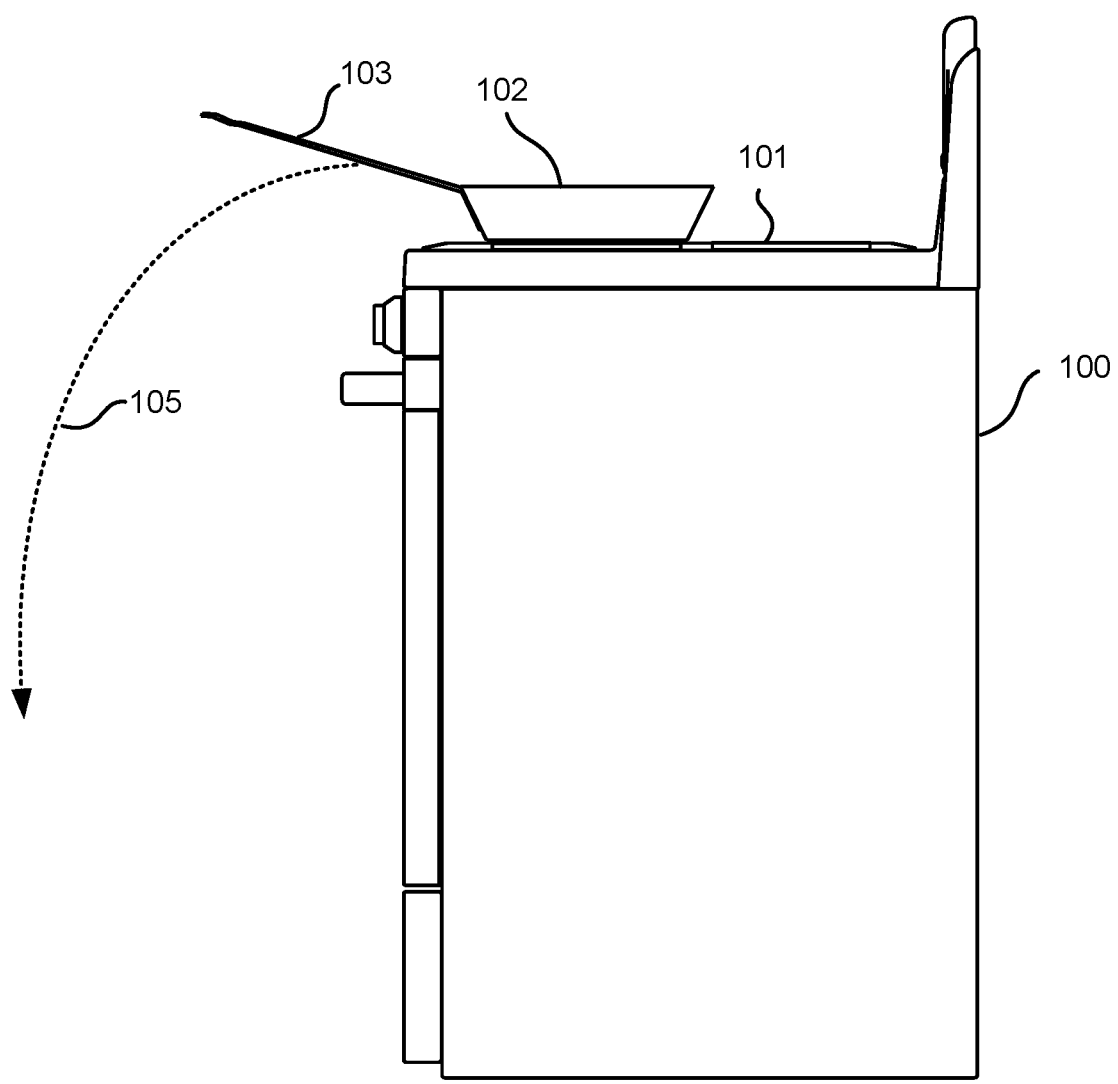
FIG. 1 illustrates a side view of an electric range with a cooking vessel sitting on top of a cooktop of the electric range.
Figure 2:
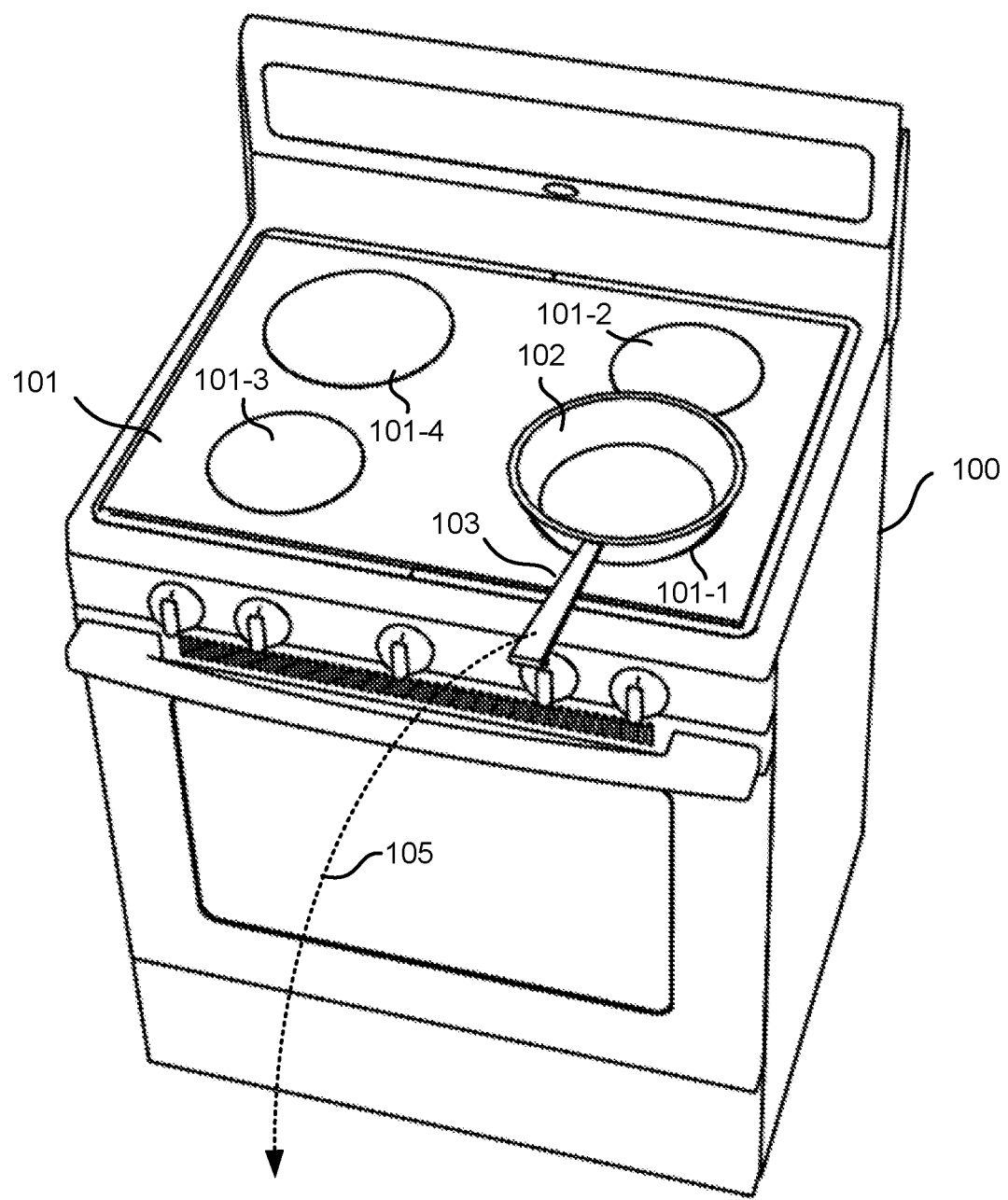
FIG. 2 illustrates a top-front perspective view of the electric range with the cooking vessel sitting on top of the cooktop of the electric range.

FIG. 1 illustrates a side view of an electric range 100 with a cooking vessel 102 (e.g., pan) sitting on top of a cooktop 101 of the electric range 100. The cooking vessel 102 may include a handle 103 which can extend beyond the electric range 100 as shown, depending on how it is positioned on the range 100. Since the cooking vessel 102 is not secured to the cooktop 101, the chances of accidentally tipping over the pan increases when the handle 103 is pointing away from the range 100, making the cooking vessel 102 accessible and in reach of small children to pull down 105 the handle and possible obstruction for adults to accidentally tip it over, FIG. 2 illustrates a top-front perspective view of the electric range 100 with the cooking vessel 102 sitting on top of the cooktop 101 of the electric range 100. The electric range 100 may have multiple burning stations (101-1 to 101-4) on which cooking vessels may be heated. In most burn cases, the risk of injuries due to accidentally tipping over the cooking vessel increases with more vessels placed on the cooktop 101 which likely occurs on the front side cooking areas (101-1 and 101-3) of the electric range 100.

Figure 3A:
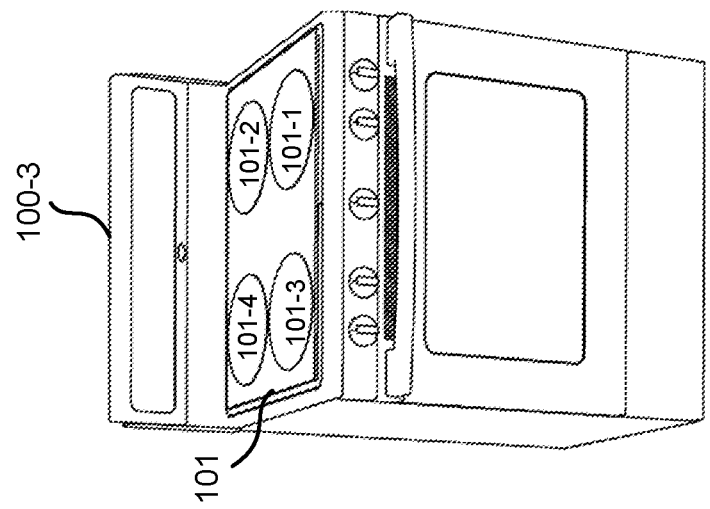
FIG. 3A-FIG. 3C illustrate different types of electric ranges available on the market.
Figure 3B:
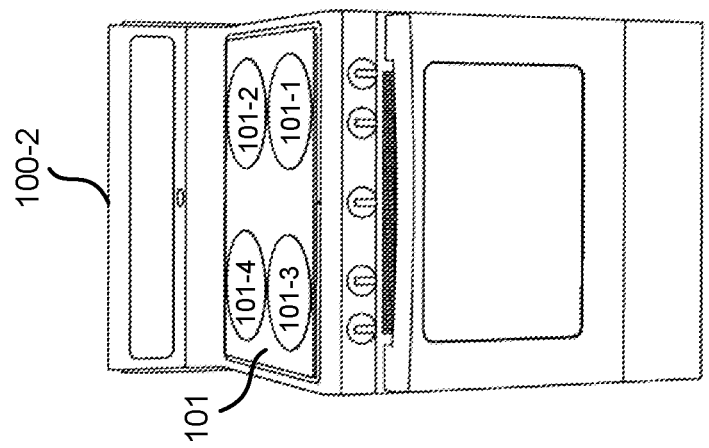
Figure 3C:
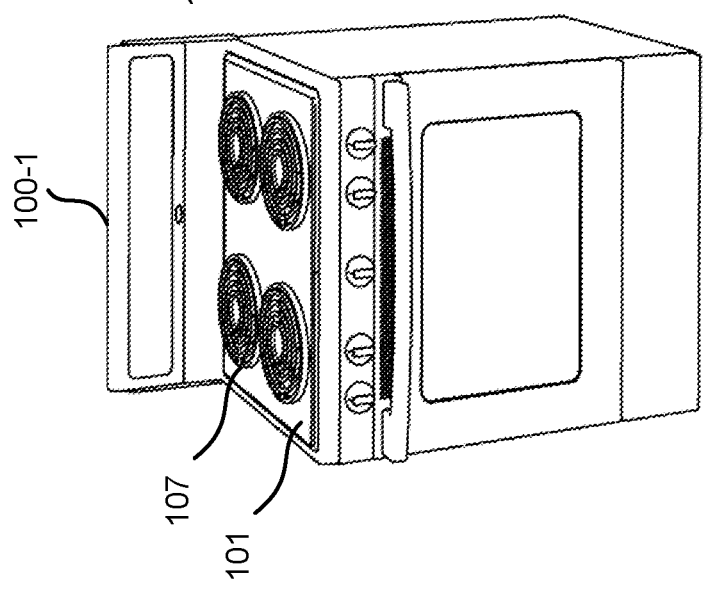

FIG. 3A-FIG. 3C illustrate different types of electric ranges available on the market. For example, FIG. 3A depicts an electric range 100-1 having one or more external burning elements 107 (or calrods) mounted above the cooktop 101. FIG. 3B depicts an infrared electric range 100-2 having internal burning elements (not shown) mounted below the cooktop 101. FIG. 3C depicts an electric induction range 100-3 having internal induction coils (not shown) mounted below the cooktop 101. In some applications, the cooktop 101 may be made from metal, glass, ceramic, or ceramic-glass blend, depending on the electric range type. Though the external appearance of the electric ranges (100-1 to 100-3) may appear similar, the way each electric range heats the cooking vessel differ in operation and heating elements applied in the electric range. For example, food in the cooking vessel 102 may be heated on the electric range 100-1 by applying the cooking vessel directly onto the external burning element 107 via thermal conduction. In operation, when a user turns on a controllable switch on the electric range via a knob, an electric current flows through the burning element 107 thereby heating it to a temperature of up to 1000° F., producing temperatures hot enough to get the burning elements to glow red hot which heats the food in the cooking vessel. Heating elements found in common electric range appliances include metallic resistance alloys such as Fe—Cr—Al and Ni—Cr(Fe). From a material stand point cooking is best achieved by cooking vessels made from cast iron, copper, stainless steel and aluminum.

For infrared electric range 100-2, the internal electric burner elements are located underneath the cooktop 101, transferring heat through the cooktop 101 allowing it to heat the cooking vessel 102 placed on top of it. During heating, electrical current flows through the heating elements causing it to become extremely hot. Once the heating elements are heated, this heat is transferred through the cooktop 101 via transmitted heat or indirect radiation. The thermal conduction is heated evenly across each burning station (101-1 to 101-4) on the cooktop which heats food contained in the cooking vessel 102. Once the heating elements are turn off, the cooktop (glass or ceramic) will continue to be hot, even after the electrical current is turned off. The residual heat on the cooktop surface remains for a period of time until it is cooled to room temperature. Many electric cooktops today have a light indicator letting the user know when the burner has cooled down.

For electric induction ranges 100-3, the heating operations in these types of cooktops are quite different from the other two types of electric cooktops previously presented. During induction cooking, heat is generated by using direct induction heating of the cooking vessels, rather than heat generated by indirect radiation, convection, or thermal conduction as described in the previous electric cooktops. Though all electric cooktops provide heat through a heating element, the induction cooktops uses a copper coil, instead of the calrod, as a primary heating source to heat the cooking vessel. For example, many of today's induction heating appliances utilize electromagnetic radiation via a magnetic copper coil located underneath the cooktop to generate and distribute heat the cooking vessel through the cooktop. In operation, a current of electricity alternates as it passes through the copper coil and directly to the cooking vessel through the cooktop. In turn, this alternating current forms a magnetic field that oscillates, inducing an electrical current in the cooking vessel which in turn heats the cooking vessel and food contained therein.

The electric induction ranges 100-3 have several advantages over gas cooktops and the other two types of electric cooktops previously presented, including better heating efficiencies (i.e., less wasted heat), quick on/off response times, extremely safe as compared to gas cooktops, outputs virtually no air pollution, easy to clean because of the smooth and planar surface on these types of cooktops, and virtually no induced heating on the surface of the cooktop since only the cooking vessel is heated during induction heating, and not the cooktop itself.

Figure 4B:
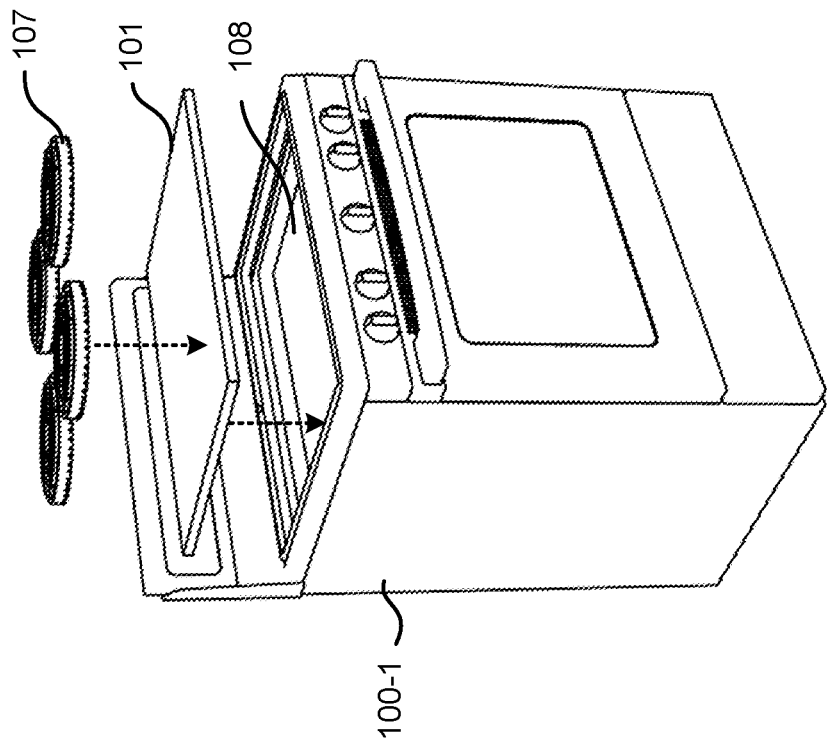
FIG. 4A-FIG. 4B illustrate a side exploded view and a front-side exploded view of the electric range having one or more external burning elements.
Figure 4A:
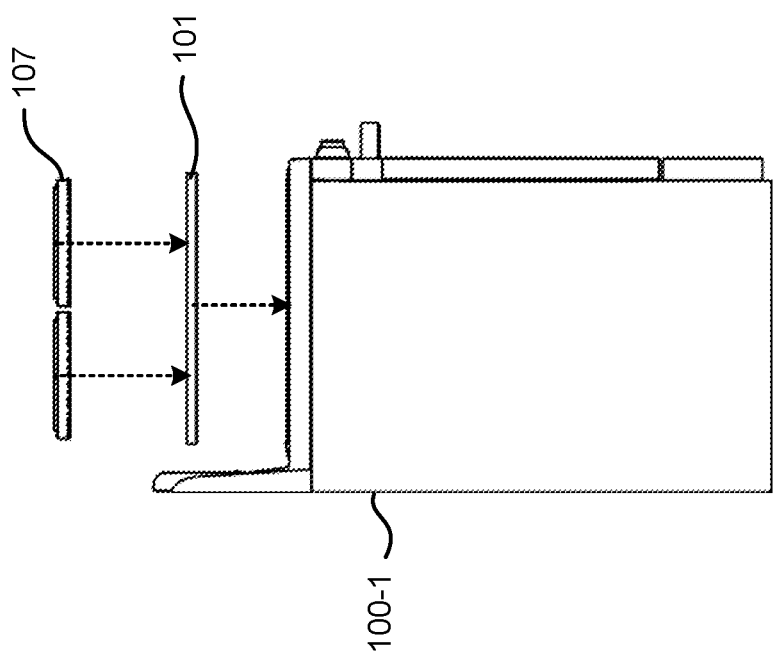

FIG. 4A-FIG. 4B illustrate a side exploded view and a front-side exploded view of the electric range 100-1 having one or more external burning elements 107. In this arrangement, the one or more external burning elements 107 are disposed above the surface of the cooktop 101 while the cooktop 101 is disposed on a top portion of the electric range 100-1, covering a chamber 108 contained therein. The chamber 108 may include and support other electronic devices (not shown) such as switches, relays, transformers, circuit boards, and controllers which operate the electrical components within the electric range 100-1.

Figures 5A, 5B:
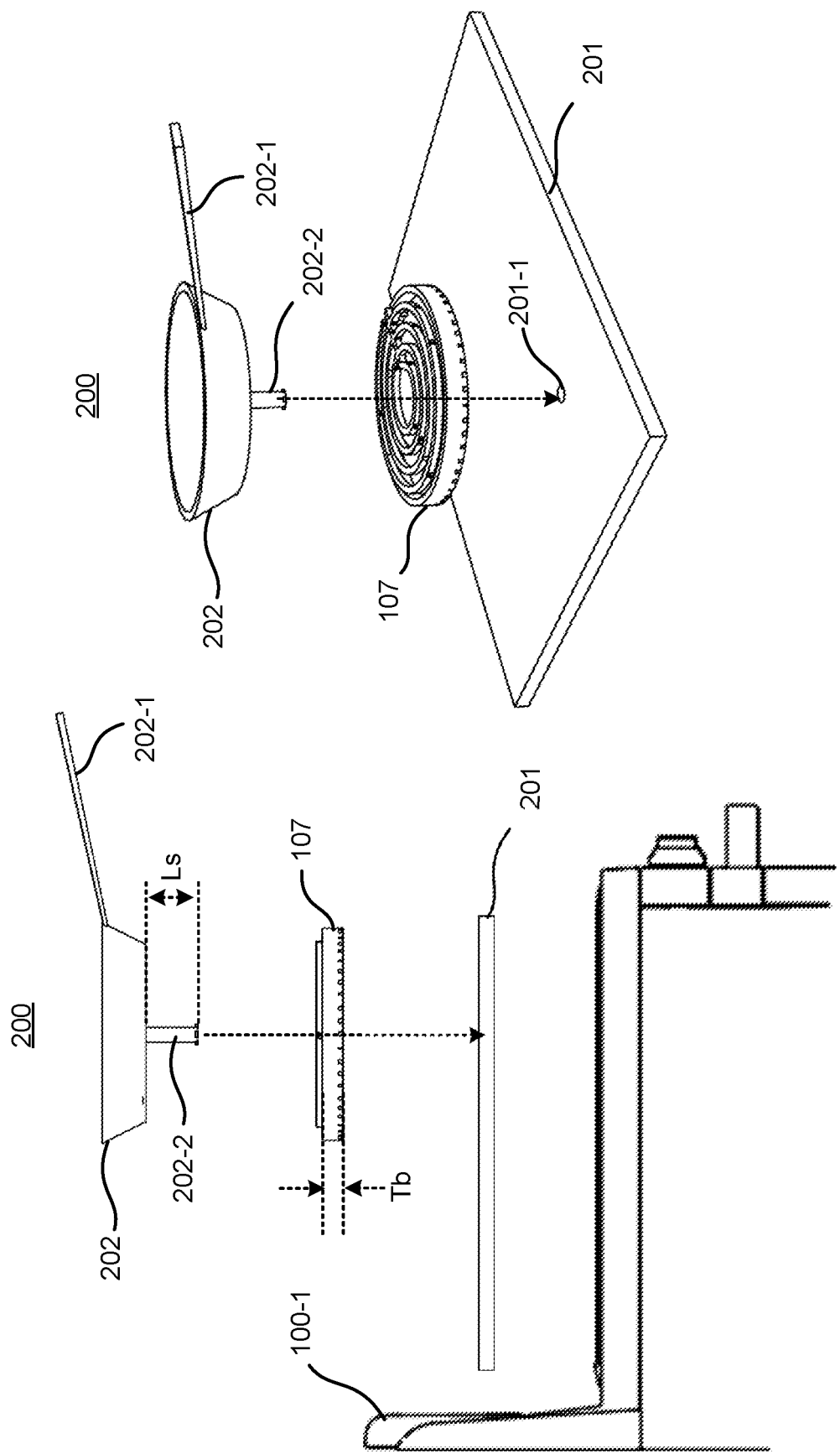
FIG. 5A-FIG. 5B illustrate a side exploded view and a front-side exploded view of an electric cooktop safety system for the electric range, according to an embodiment.

FIG. 5A-FIG. 5B illustrate a side exploded view and a front-side exploded view of an electric cooktop safety system 200 for the electric range 100-1, according to an embodiment. The electric cooktop safety system 200 may include a safety cooking vessel 202 having a handle 202-1 and a safety stem 202-2. The electric cooktop safety system 200 may also include a safety cooktop 201 having a planar surface and a bottom stem locking member 201-2 embedded in the safety cooktop 201. In application, the safety cooktop 201 may replace the existing cooktop 101 shown in the previous examples. In addition, the safety stem 202-2 of the safety cooking vessel 202 has a stem length Ls which allows the safety stem 202-2 to extend through the external burning elements 107 having a thickness Tb and fasten to a bottom stem locking member 201-1 embedded in the safety cooktop 201. In practice, a bottom portion of the safety stem 202-2 having a first keyed member may be detachably coupled to the bottom stem locking member 201-1.

Figure 6A:
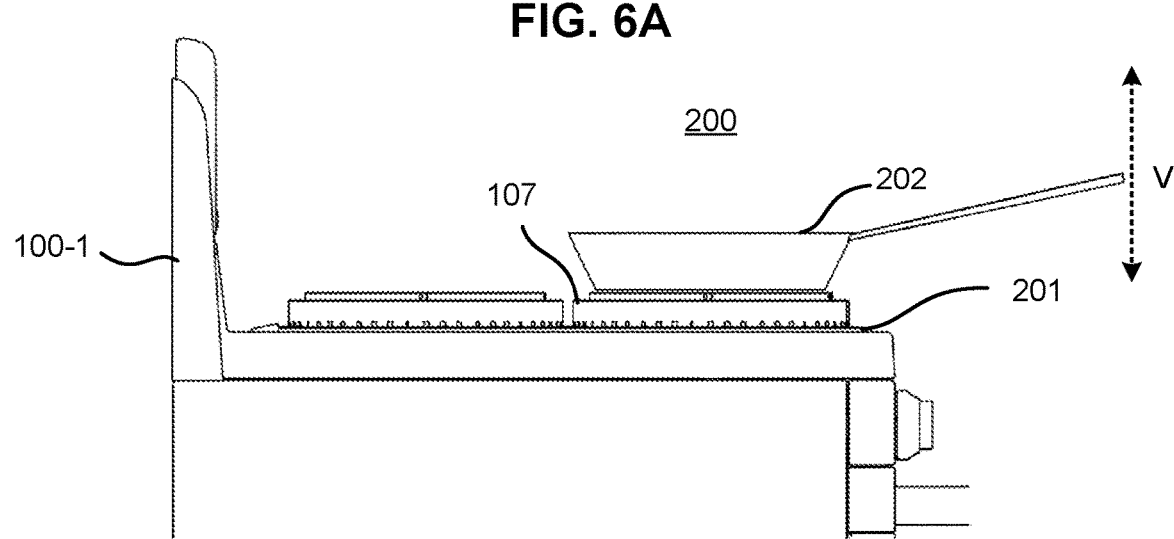
FIG. 6A-FIG. 6B illustrate a side view and a perspective front-side view of the electric cooktop safety system secured to the electric range, according to an embodiment.
Figure 6B:
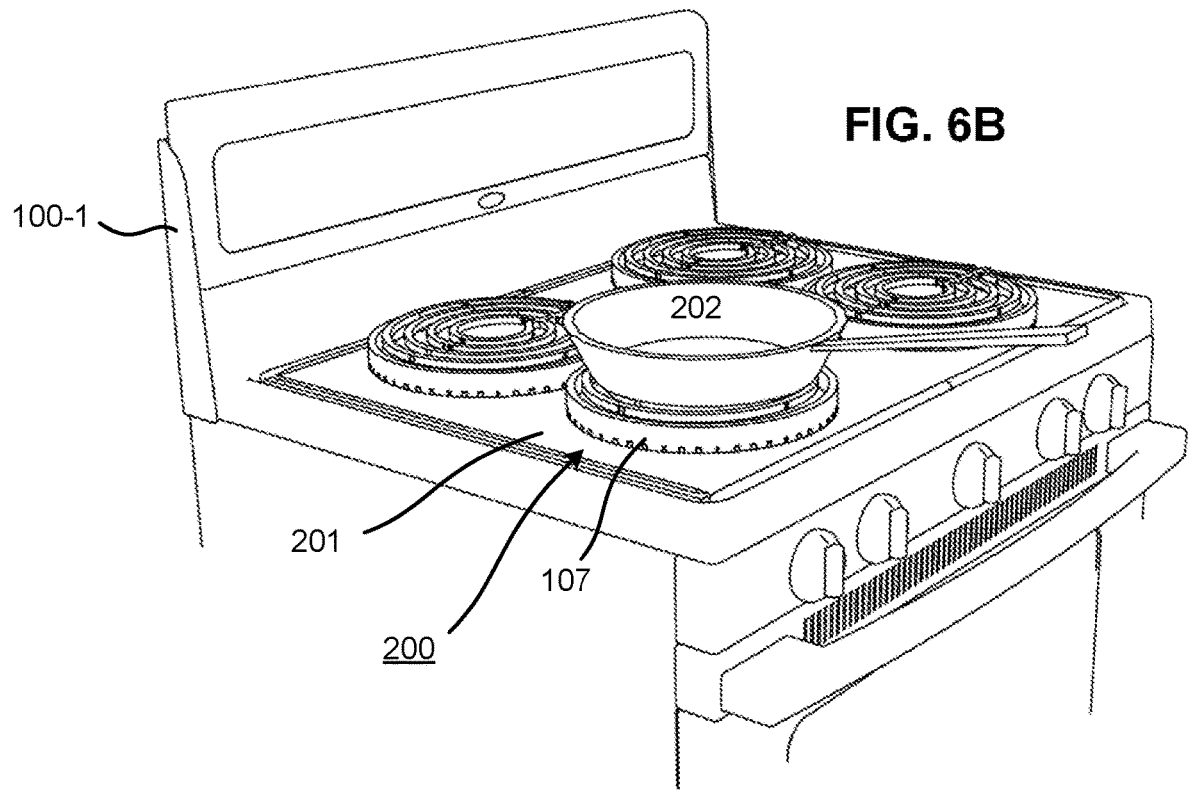

FIG. 6A-FIG. 6B illustrate a side view and a perspective front-side view of the electric cooktop safety system 200 secured to the electric range 100-1, according to an embodiment. A bottom outer surface of the safety cooking vessel 202 sits flushed against a top surface of the external burning elements 107 when the safety stem 202-2 of the safety cooking vessel 202 is properly secured to the safety cooktop 201. When fastened to the safety cooktop 201, the secured safety cooking vessel 202 is unable to move in a vertical direction V, preventing the cooking vessel 202 from being pulled off, tipping over, or falling off the electric range 100-1.

Figure 7B:
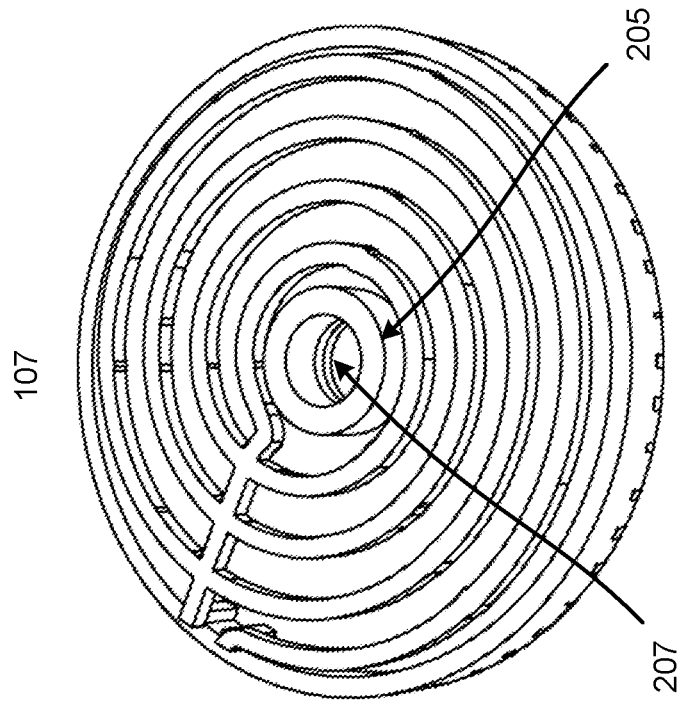
FIG. 7A-FIG. 7B illustrate a top view and a front-side perspective view of the external burning elements, according to an embodiment.
Figure 7A:
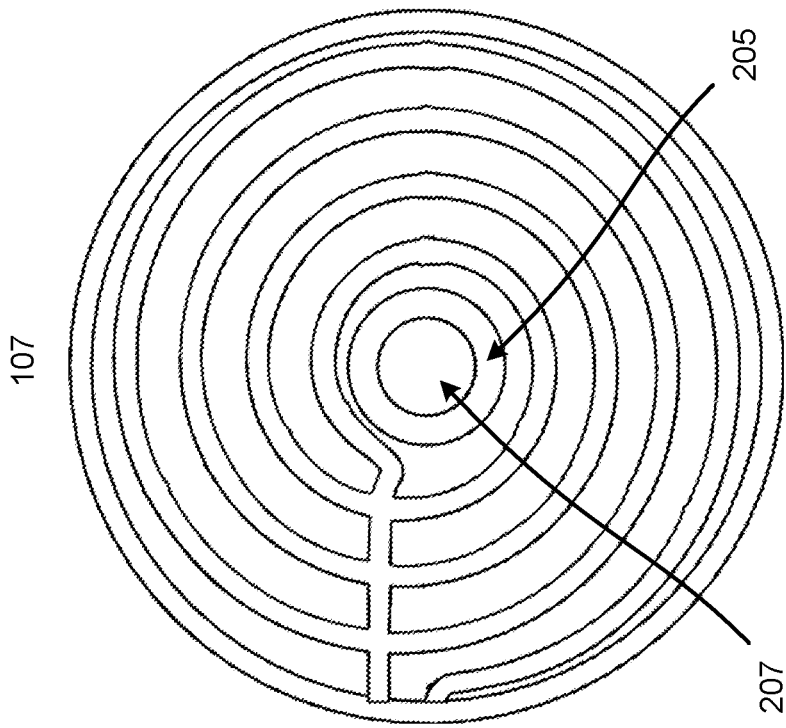

FIG. 7A-FIG. 7B illustrate a top view and a front-side perspective view of the external burning elements (calrods) 107, according to an embodiment. In some applications, the external burning elements 107 may or may not have an opening in the center portion of the external burning elements 107. In the case where there is no center opening in the external burning elements 107, the external burning elements 107 may be adapted to include a center fixture 205 which provides a slot 207 through which the safety stem 202-2 of the safety cooking vessel 202 may pass.

Figure 8A:
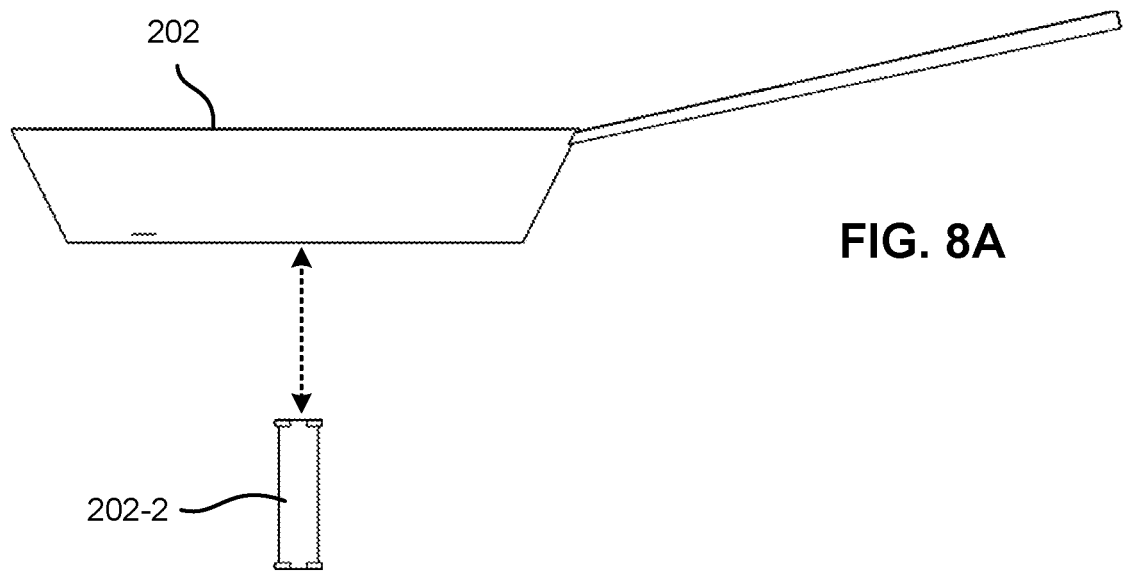
FIG. 8A-FIG. 8B illustrate a side view and a bottom-side perspective view of the safety cooking vessel and safety stem, according to an embodiment.
Figure 8B:
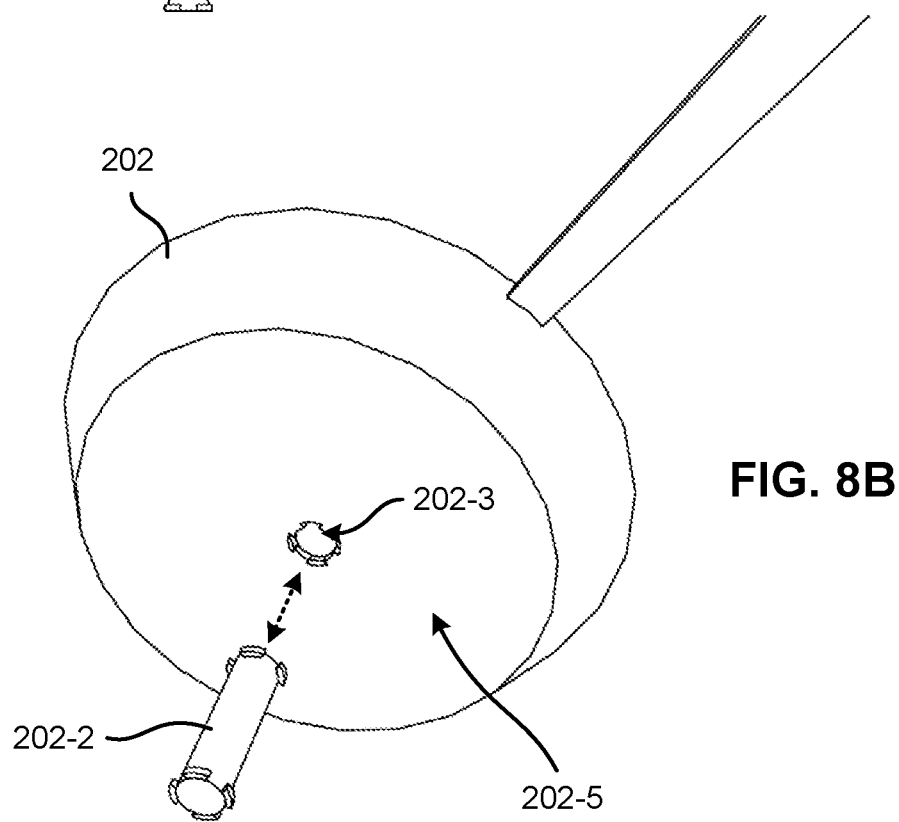

FIG. 8A-FIG. 8B illustrate a side view and a bottom-side perspective view of the safety cooking vessel 202 and safety stem 202-2, according to an embodiment. In one implementation, the safety stem 202-2 may be permanently mounted or welded to the safety cooking vessel 202 along a center portion thereof. In another implementation, the safety stem 202-2 may have quick-release components which allow it to be detachably coupled to a top stem locking member 202-3 disposed and embedded in an outer bottom surface 202-5 of the safety cooking vessel 202 as shown in FIG. 8A-FIG. 8B. In practice, the quick-release components allow the user to easily detach and easily remove the safety stem 202-2 from the outer bottom surface 202-5 of the safety cooking vessel 202 which can then be used on conventional ranges not equipped with the safety cooktop 201. In addition, having a detachable safety stem 202-2 allows the user to replace or upgrade the safety stem 202-2 should it get lost, damaged, or broken.

Figure 9A:
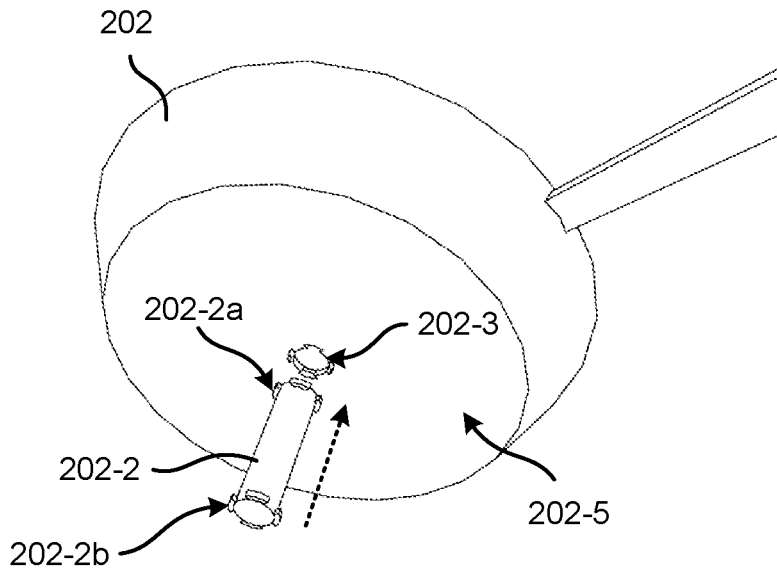
FIG. 9A-FIG. 9C illustrate a steps for inserting and fastening the detachable safety stem into the top stem locking member, according to an embodiment.
Figure 9B:
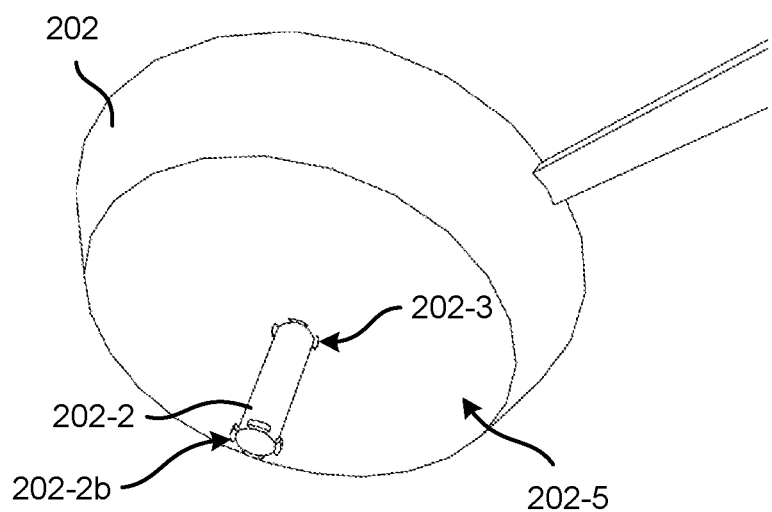
Figure 9C:
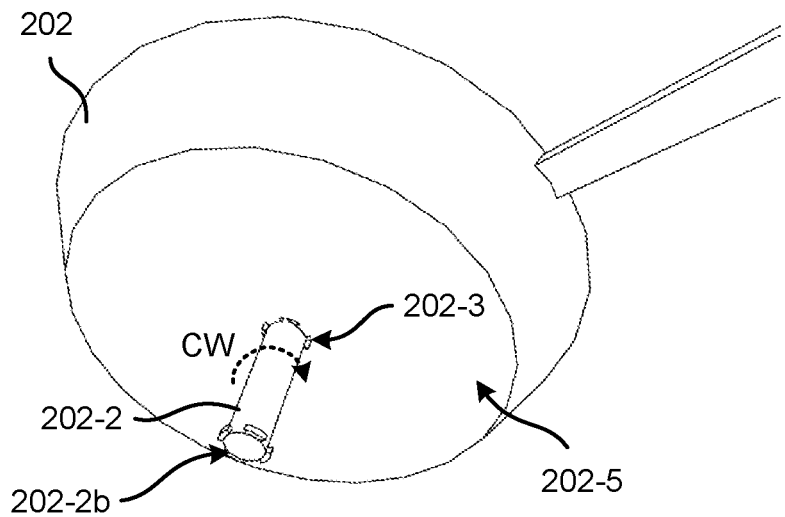

FIG. 9A-FIG. 9C illustrate a steps for inserting and fastening the detachable safety stem 202-2 into the top stem locking member 202-3, according to an embodiment. For example, the quick-release components of the safety stem 202-2 may include a first keyed member 202-2a disposed at a first distal end of the safety stem 202-2 and a second keyed member 202-2b disposed at a second distal end of the detachable safety stem 202-2. Steps for inserting and securing the detachable safety stem 202-2 into the top stem locking member 202-3 are as follows:

1. Positioning the detachable safety stem 202-2 with the first keyed member 202-2a aligned to the top stem locking member 202-3, as shown in FIG. 9A.
2. Inserting the first keyed member 202-2a by pushing it into a slot or opening in the top stem locking member 202-3, and resting against an inner planer surface of the safety cooking vessel 202, as shown in FIG. 9B.
3. After insertion, twisting the detachable safety stem 202-2 about an eighth-of-a-turn (or about 45 degrees) in a clockwise direction CW to lock the safety stem 202-2 into top stem locking member 202-3, as shown in FIG. 9C.

Steps for removing the detachable safety stem 202-2 from the top stem locking member 202-3 are in reverse order from the previous steps, including:

1. With the detachable safety stem 202-2 attached to the top stem locking member 202-3, twisting the detachable safety stem 202-2 about an eighth of a turn (or about 45 degrees) in a counter-clockwise direction CCW to unlock the safety stem 202-2 from top stem locking member 202-3.
2. Removing the detachable safety stem 202-2 from the safety cooking vessel 202 by pulling it away from the safety cooking vessel 202.

FIG. 10A-FIG. 10B illustrate close-up and detailed view of the detachable safety stem 202-2, according to an embodiment. The detachable safety stem 202-2 may have a cylindrical shaped stem body 202-2c with the first keyed member 202-2a and the second keyed member 202-2b disposed along both outer ends of the stem body 202-2c. The first keyed member 202-2a and the second keyed member 202-

2b have one or more ridges or teeth-like members similar to that of a key which have a shape and pattern that is complementary to the top stem locking member 202-3 and bottom stem locking member 201-1, respectively. In this implementation, each tooth-like member may have a similar curved plate structure which is equally distributed along the outer edge of the detachable safety stem 202-2 (see FIG. 10B). In practice, both the cylindrical shaped stem body 202-2c and the first keyed member 202-2a and the second keyed member 202-2b of the detachable safety stem 202-2 may be constructed and fabricated from durable, strong, and heat-resistant materials such as stainless steel and cast iron. In addition, the entire detachable safety stem 202-2 may be made from magnetic materials which can provide additional bonding strength to the safety cooking vessel 202.

FIG. 11A-FIG. 11B illustrate expanded and detailed view of the top stem locking member 202-3 and bottom stem locking member 201-1, according to an embodiment. The bottom stem locking member 201-1 is embedded in the safety cooktop 201 and the top stem locking member 202-3 is embedded in the safety cooking vessel 202. Each stem locking members (202-3, 201-1) may be configured as keyed slots formed into which the first and second keyed members (202-2a, 202-2b) of the safety stem 202-2 are fastened. For example, the top and bottom stem locking members (202-3, 201-1) may have an opening (slot or hole) disposed in the safety cooking vessel 202 and the safety cooktop 201, each opening having a complementary shape 209 to that of the first and second keyed members (202-2a, 202-2b) as shown a front facing view in FIG. 11B. In addition, the opening provides an access port through which the first and second keyed members (202-2a, 202-2b) are inserted and then twisted an eighth-of-a-turn in the CW direction to fasten and lock the safety stem 202-2 to the top and bottom stem locking members (202-3, 201-1), resting and pressing against an inner planer surface 211 of the safety cooktop 201 or the safety cooking vessel 202. In practice, the second keyed member 202-2b of the safety stem 202-2 may be detachably coupled to the bottom stem locking member 201-1, thereby allowing the safety cooking vessel 202 to be easily attached and detached to and from the safety cooktop 201.

FIG. 12A-FIG. 12C illustrate other design configurations of the detachable safety stem 202-2, according to an embodiment. In one implementation, the keyed members of the detachable safety stem 202-2 may include one or more spring-loaded ball locking fasteners (202-2a1, 202-2b1) and a quick-release lever 213 that allows the spring-loaded balls to plunge into a recessed opening 213-1 disposed within the stem body 202-2c when the quick-release lever 213 is depressed, and locks the spring-loaded balls into place when the quick-release lever 213 is released, preventing it from being pushed into the stem body 202-2c, as shown in FIG. 12A. In yet another implementation, the keyed members of the detachable safety stem 202-2 may include one or more spring-loaded teeth-like locking fasteners (202-2a2, 202-2b2) and also a quick-release lever 213 that allows the teeth-like fasteners to plunge into the recessed opening 213-1 disposed within the stem body 202-2c when the quick-release lever 213 is depressed, and locks the teeth-like fasteners into place when the quick-release lever 213 is released, preventing it from being pushed into the stem body 202-2c, as shown in FIG. 12B. In still yet another implementation, the keyed members of the detachable safety stem 202-2 may have a combination of the different types of fasteners (202-2a1, 202-2b) disposed at each end portions of the detachable safety stem 202-2, as shown in FIG. 12C. In other implementations, the stem body 202-2c may include bars, rods, or other elongated shaped bodies capable of supporting the keyed members.

Figure 13A:
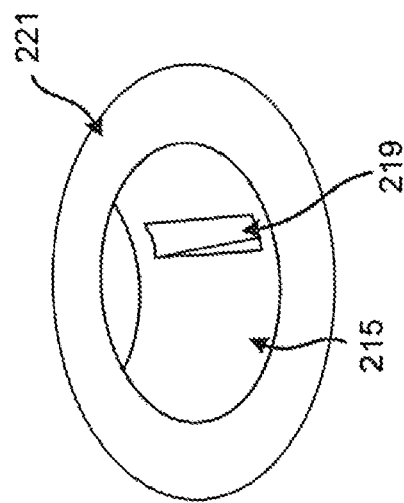
FIG. 13A-FIG. 13C illustrate various configurations of the stem locking members, according to an embodiment.
Figure 13B:
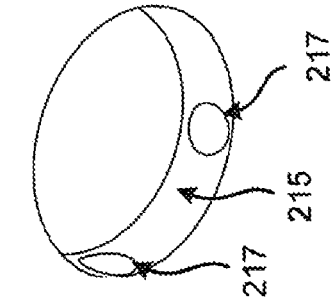
Figure 13C:
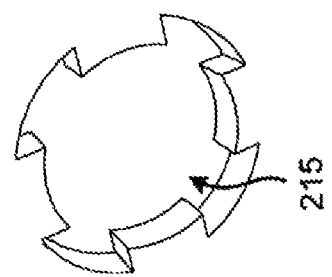

FIG. 13A-FIG. 13C illustrate various configurations of the stem locking members (201-1, 202-3), according to an embodiment. In FIG. 13A, the stem locking members (201-1, 202-3) may have an insert slot 215 configured to receive the detachable safety stem 202-2 having keyed members (202-2a, 202-2b) which locks into the stem locking members (201-1, 202-3) via twisting the detachable safety stem 202-2 by an eighth-of-a-turn in the CW direction as previously described. In FIG. 13B, the stem locking members (201-1, 202-3) may include an insert slot 215 having spherical slots 217 disposed along a sidewall of the insert slot 215 and configured to receive the detachable safety stem 202-2 having spring-loaded ball locking fasteners (202-2a1, 202-2b1), which is locked into place when the quick-release lever 213 of the detachable safety stem 202-2 is released. In FIG. 13C, the stem locking members (201-1, 202-3) may include an insert slot 215 having an elongated keyed slots 219 disposed along a sidewall of the insert slot 215 and configured to receive the detachable safety stem 202-2 having spring-loaded teeth-like fasteners (202-2a2, 202-2b2), which is locked into place when the quick-release lever 213 of the detachable safety stem 202-2 is released. In another implementation, a reinforcement member 221, such as high density metal plates or rings, may encompass and surround the stem locking members (201-1, 202-3), providing additional tensile strength and support to stem locking members (201-1, 202-3). Preferably, portions reinforcement member 221 of contrastingly great material strength to support the weight of the safety cooking vessel 202 and food disposed thereon. Portions reinforcement member 221 may also be integrally formed with reinforced walls so that, while resilient, may also resist bending the safety stem 202-2 or the insert slot 215 during use.

Figure 14B:
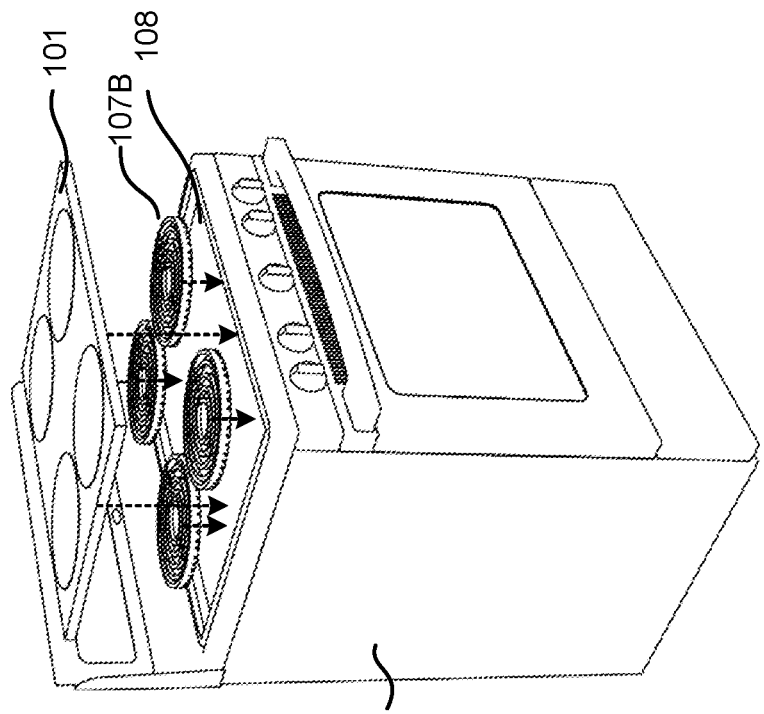
FIG. 14A-FIG. 14B illustrate a side exploded view and a front-side exploded view of electric ranges having internal heating elements.
Figure 14A:
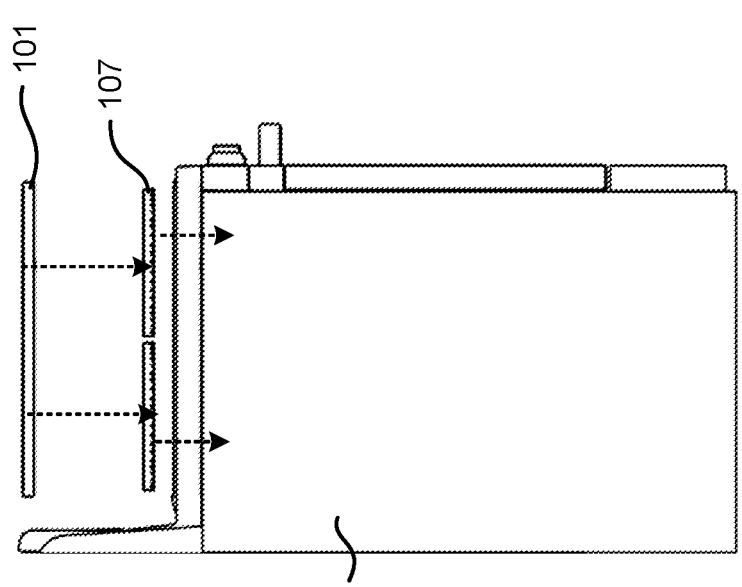

FIG. 14A-FIG. 14B illustrate a side exploded view and a front-side exploded view of electric ranges 100-2 or 100-3 having internal heating elements 107B. For these types of electric ranges, the cooktop 101 is disposed above the internal heating elements 107B which are enclosed in an upper chamber 108 of a top portion of the electric ranges 100-2 or 100-3. The chamber 108 may a platform (not shown) which support other electronic devices (not shown) such as switches, relays, transformers, circuit boards, and controllers which operate the electrical components within the electric ranges 100-2 and 100-3.

Figure 15B:
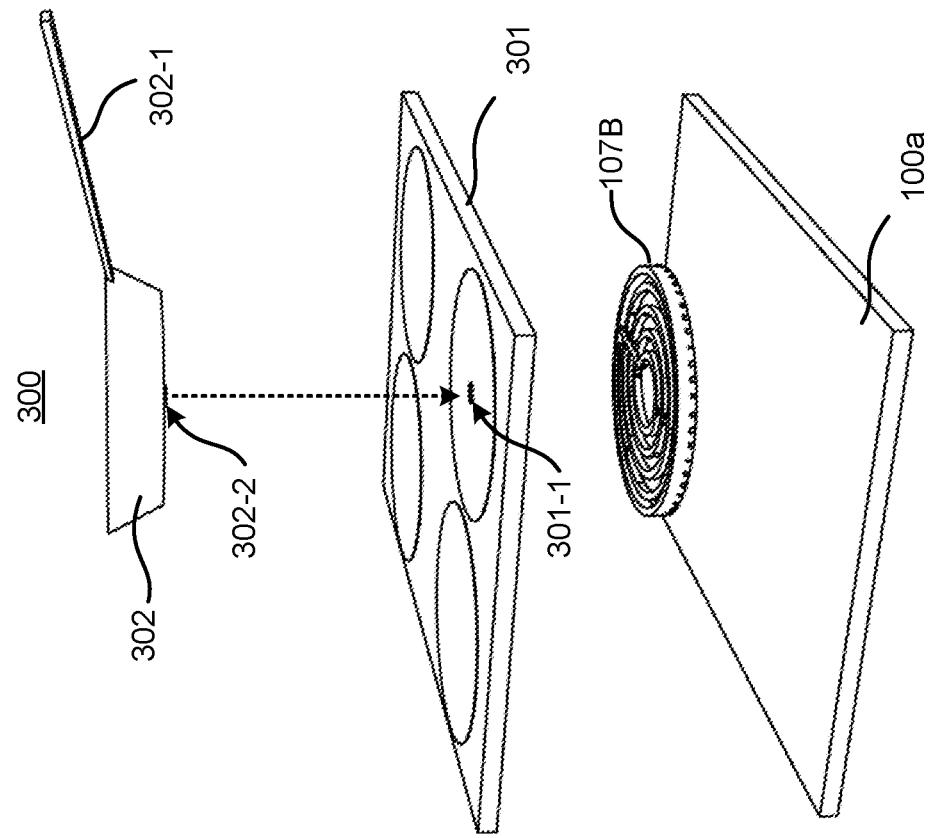
FIG. 15A-FIG. 15B illustrate a side exploded view and a front-side exploded view of an electric cooktop safety system 300 for the electric ranges, according to an embodiment.
Figure 15A:
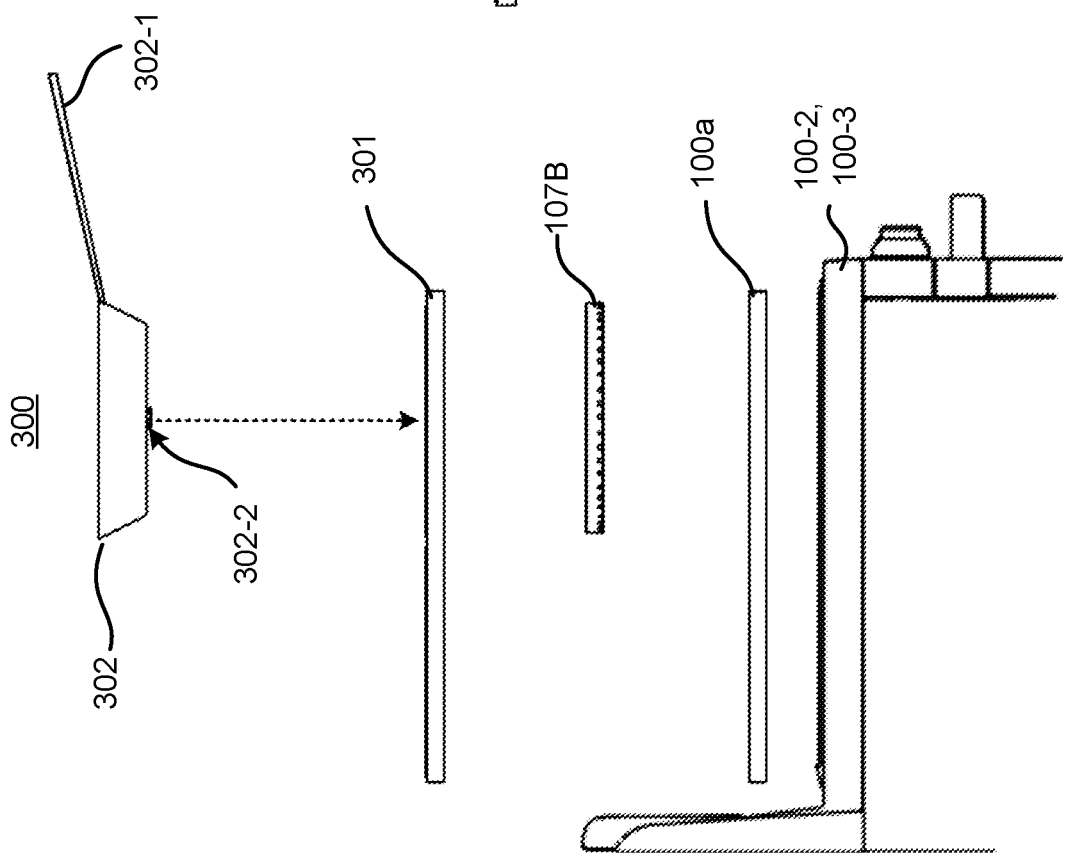

FIG. 15A-FIG. 15B illustrate a side exploded view and a front-side exploded view of an electric cooktop safety system 300 for the electric ranges 100-2 or 100-3, according to an embodiment. The electric cooktop safety system 300 may include a safety cooking vessel 302 (including an optional handle 302-1) and a safety stem 302-2 having similar features and functionalities to the safety cooking vessel 202 and safety stem 202-2 described in the previous safety system 200 hereinabove. The internal heating elements 107B are disposed underneath a safety cooktop 301 and supported by the platform 100a for both the infrared and induction electric ranges 100-2 and 100-3. In this implementation, the safety stem 302-2 can mount directly onto the safety cooktop 301, securing to a bottom stem locking member 301-1 disposed therein. In application, the safety cooktop 301 can be fabricated and configured to be a direct replacement to the conventional cooktop 101 shown in the earlier examples.

Figure 16A:
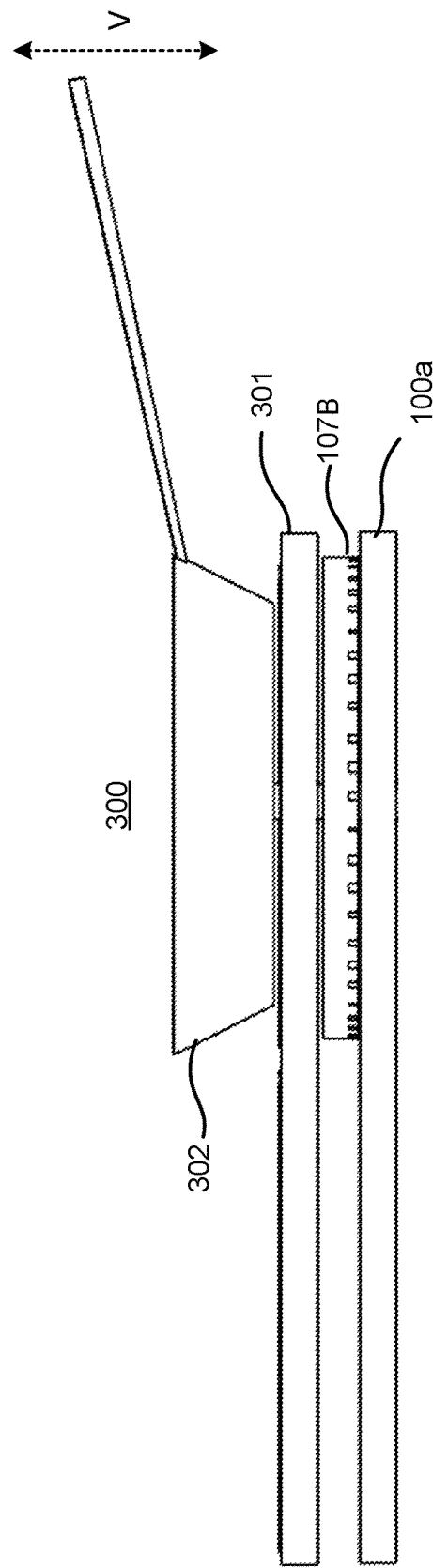
FIG. 16A-FIG. 16B illustrate an internal side view and an internal perspective front-side view of the electric cooktop safety system which is applied to the electric ranges, according to an embodiment.
Figure 16B:
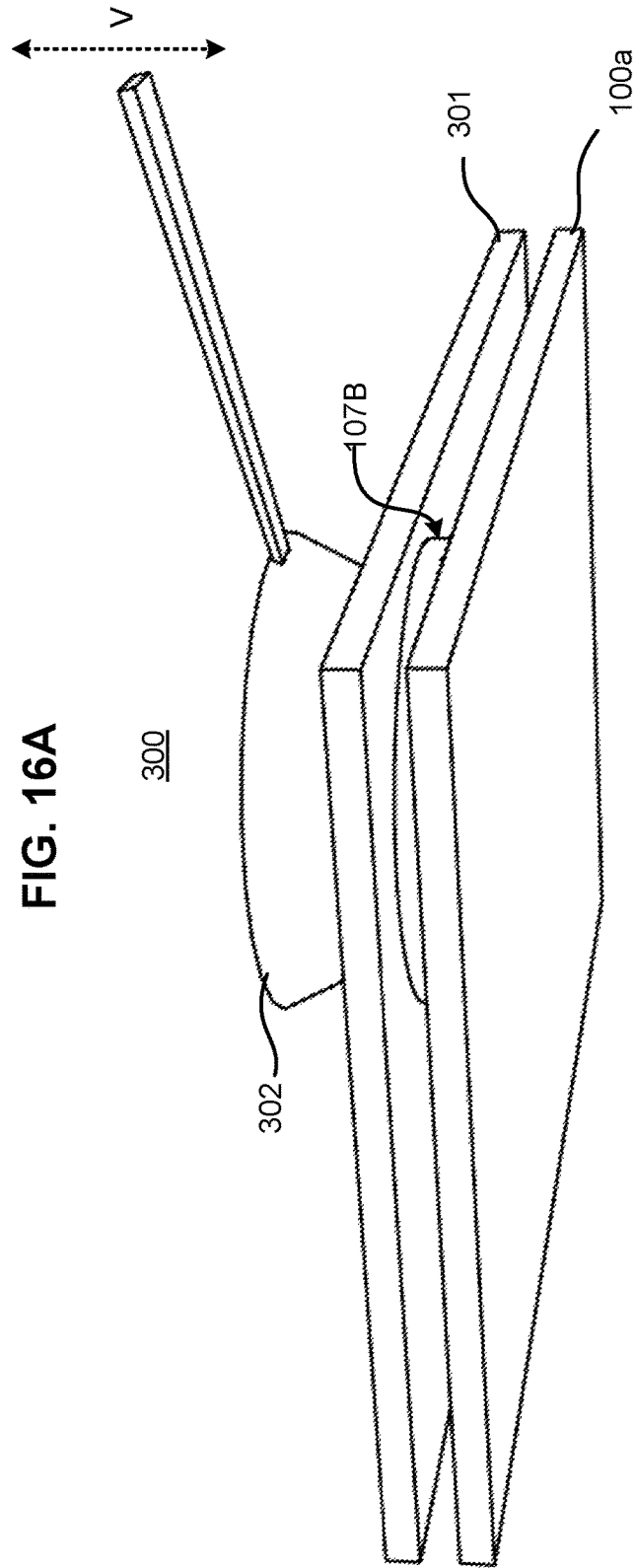

FIG. 16A-FIG. 16B illustrate an internal side view and an internal perspective front-side view of the electric cooktop safety system 200 which is applied to the electric ranges 100-2 or 100-3, according to an embodiment. A bottom outer surface of the safety cooking vessel 302 sits flushed against a top planar surface of the safety cooktop 301 when the safety stem 302-2 of the safety cooking vessel 302 is properly secured to the safety cooktop 301. When fastened to the safety cooktop 301, the secured safety cooking vessel 302 is unable to move in a vertical direction V, preventing the cooking vessel 302 from being pulled off, tipping over, or falling off the electric range 100-2 or 100-3.

FIG. 17A-FIG. 17B illustrate a side view and a bottom-side perspective view of the safety cooking vessel 302 and safety stem 302-2, according to an embodiment. In one aspect, the safety stem 302-2 may be permanently mounted or welded to the safety cooking vessel 302 along a center portion thereof. In another aspect, the safety stem 302-2 may have quick-release components which allow it to be detachably coupled to a top stem locking member 302-3 disposed and embedded in an outer bottom surface 302-5 of the safety cooking vessel 302 as shown in FIG. 18A-FIG. 18B. In operation, the quick-release components allow the user to easily detach and easily remove the safety stem 302-2 from the outer bottom surface 302-5 of the safety cooking vessel 302 which can then be used on other types of cooking ranges not equipped with the safety cooktop 301. In addition, having a detachable safety stem 302-2 allows the user to replace or upgrade the safety stem 302-2 should it get lost, damaged, or broken.

FIG. 18A-FIG. 18C illustrate close-up and detailed view of the detachable safety stem 302-2, according to an embodiment. The detachable safety stem 302-2 may have a cylindrical shaped stem body 302-2c with keyed members (302-2a, 302-2b) disposed along its outer ends. The keyed members (302-2a, 302-2b) have one or more ridges or teeth-like members similar to that of a key which have a shape and pattern that is complementary to the stem locking members (301-1, 302-3). As shown in FIG. 18A and FIG. 18C, each tooth-like member may have a similar curved plate structure which is equally distributed along the outer edge of the detachable safety stem 302-2 forming a keyed structured that is configured to fit and detachably fasten to the stem locking members (301-1, 302-3). In addition, the stem body 302-2c of the detachable safety stem 302-2 may a stem length Ls which is short in length for accommodating electric range 100-2 or 100-3 which have internal heating elements, as shown in FIG. 18B.

In practice, both the cylindrical shaped stem body 302-2c and keyed members (302-2a, 202-2b) of the detachable safety stem 302-2 may be constructed from durable, high-density, and heat-resistant materials such as stainless steel and cast iron. In addition, the entire detachable safety stem 302-2 may be made from magnetic materials which can provide additional bonding strength to the safety cooking vessel 302.

FIG. 19A-FIG. 19B illustrate expanded and detailed view of the stem locking members (301-1, 302-3), according to an embodiment. The bottom stem locking member 301-1 embedded in the safety cooktop 301 and top stem locking member 302-3 embedded in the safety cooking vessel 302 may be configured as keyed slots into which the safety stem 302-2 is fastened and secured. For example, the stem locking members (301-1, 302-3) may have a slot disposed in the safety cooking vessel 202 and the safety cooktop 301, each slot having a complementary shape 309 to that of the keyed members (302-2a, 302-2b) as shown a front facing view in FIG. 19B. In addition, each slot may provide an access port through which the keyed members (302-2a, 302-2b) are inserted and then twisted an eighth-of-a-turn in the CW direction to lock and fasten the safety stem 302-2 to stem locking members (301-1, 302-3), resting and pressing against an inner planer surface 311 of the safety cooktop 301 or the safety cooking vessel 302.

Figure 20B:
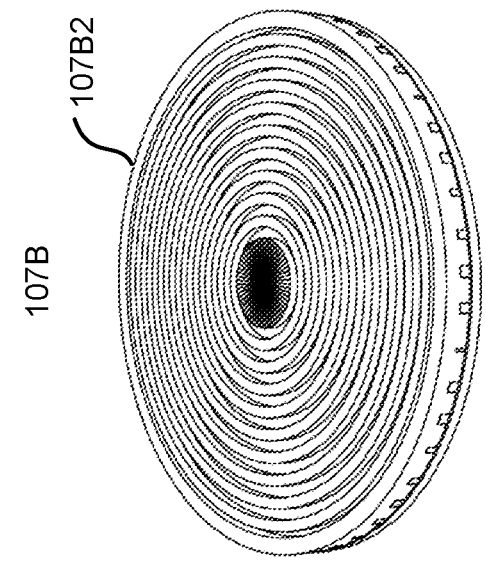
FIG. 20A-FIG. 20B illustrate front-side perspective views of the two types of internal burning elements applied to the electric range.
Figure 20A:
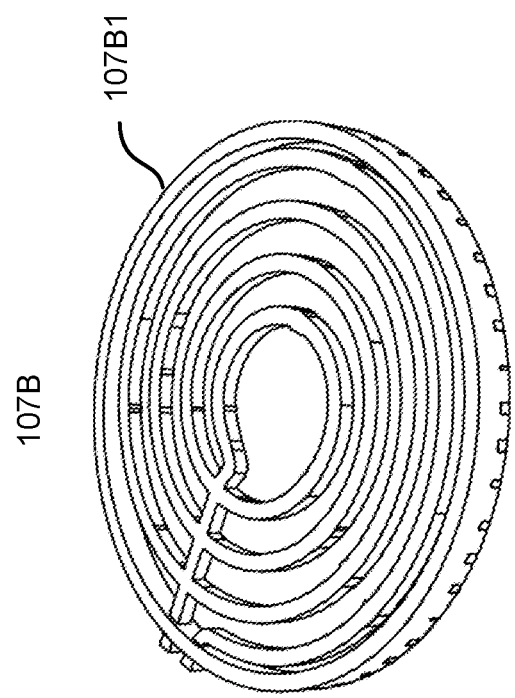

FIG. 20A-FIG. 20B illustrate front-side perspective views of the two types of internal burning elements 107B applied to the electric range 100-2 or 100-3. In one implementation shown in FIG. 20A, the internal burning element 107B may include a tubular heating elements 107B1, or calrods, having a high power density that convert electricity into heat via electric heating which is transferred through the cooktop 301 to heat the cooking vessel 302-2. In another implementation shown in FIG. 20B, the internal burning element 107B may include copper coils 107B2 which generates an oscillating magnetic field when an alternating electric current passing through it, inducing an electrical current passing through the cooktop 301 to heat the cooking vessel 302-2.

Figure 21:
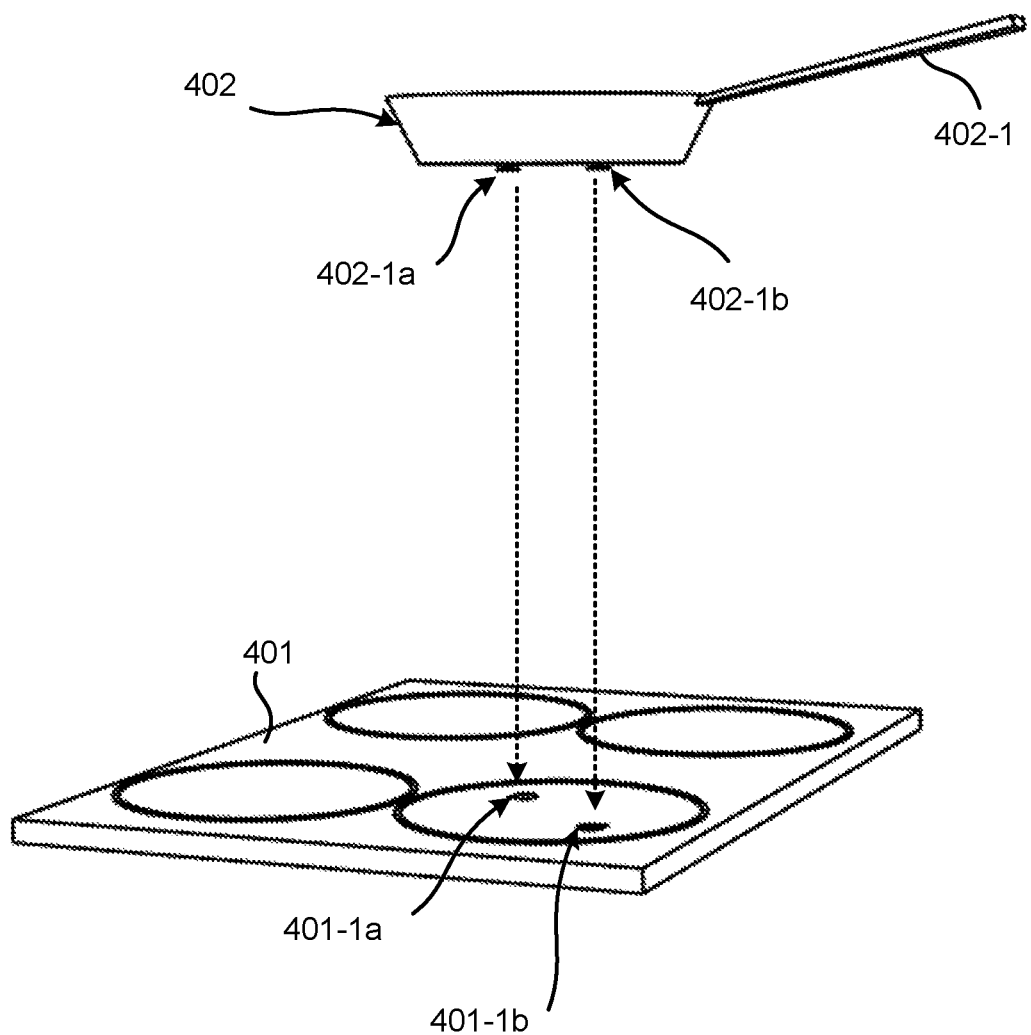
FIG. 21 illustrates a front-side perspective view of another electric cooktop safety system, according to an embodiment.

FIG. 21 illustrates a front-side perspective view of another electric cooktop safety system 400, according to an embodiment. The electric cooktop safety system 400 may include a safety cooktop 401 having multiple stem locking members (401-1a, 401-1b) embedded into a top side portion of the safety cooktop 401 and a safety cooking vessel 402 having multiple safety stem members (402-1a, 402-1b) which are adapted to fasten to the multiple stem locking members (401-1a, 401-1b) when inserted therein, securing the safety cooking vessel 402 to the safety cooktop 401.

Figure 22:
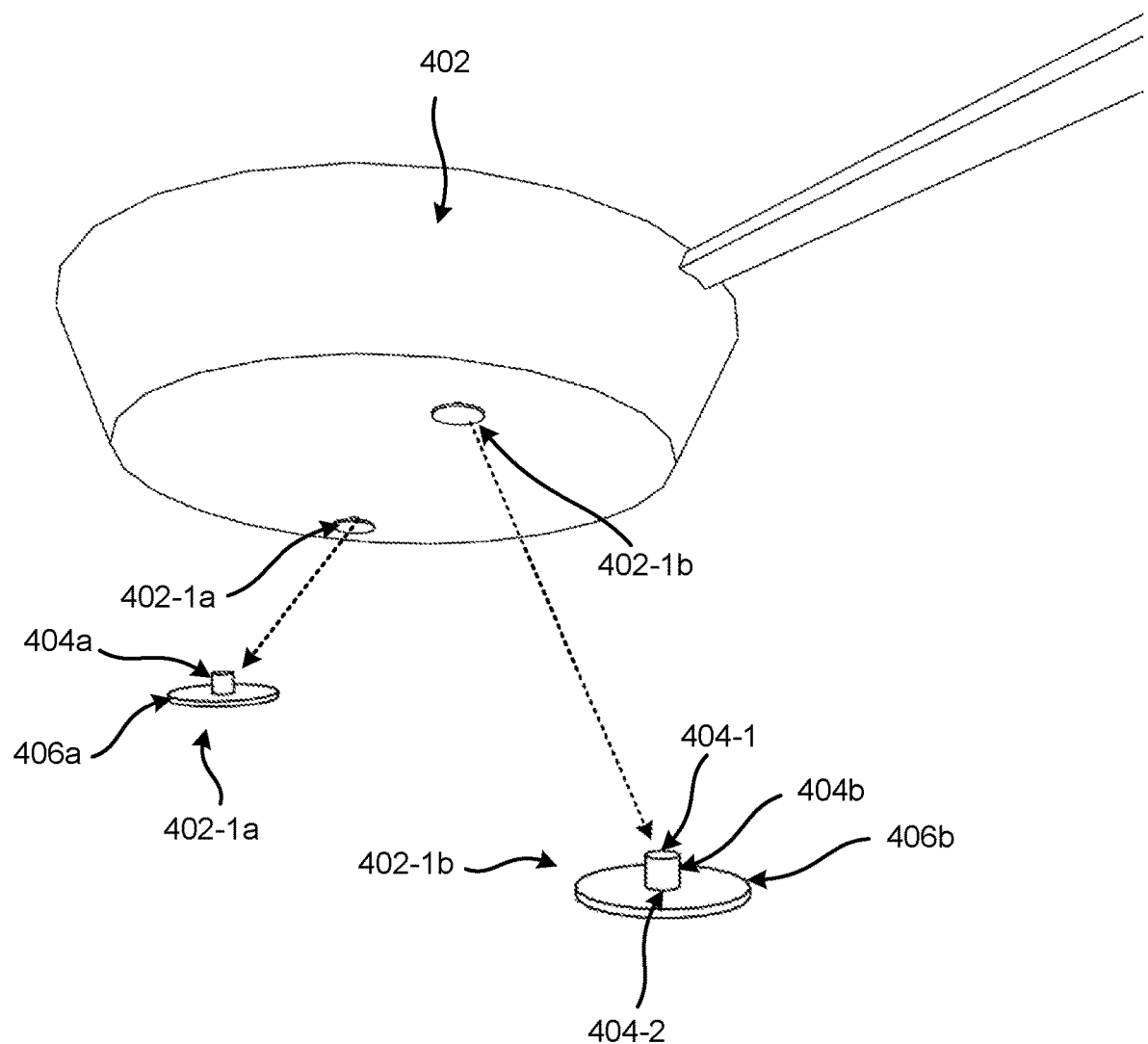
FIG. 22 illustrates a close-up view of a bottom side surface of the safety cooking vessel with the safety stem members disposed near an edge perimeter of the safety cooking vessel, according to an embodiment.

FIG. 22 illustrates a close-up view of a bottom side surface of the safety cooking vessel 402 with the safety stem members (402-1a, 402-1b) disposed near an edge perimeter of the safety cooking vessel 402, according to an embodiment. In one implementation, both safety stem members (402-1a, 402-1b) may be permanently affixed to the bottom side surface of the safety cooking vessel 402 via hardware fasteners, welding, metal casting, or metal injection molding (MIM) techniques. In another implementation, each safety stem members (402-1a, 402-1b) may be detachably coupled to the bottom side surface of the safety cooking vessel 402 allowing the user to easily remove the safety stem members (402-1a, 402-1b) therefrom. Some detachable components which can be applied to the safety stem members (402-1a, 402-1b) include keyed members (202-2a, 202-2a1, 202-2a2) as described in the previous embodiments. In addition, each safety stem members (402-1a, 402-1b) may include a stem body (404a, 404b) having a first distal end portion 401-1 coupled to the bottom side surface of the safety cooking vessel 402 and second distal end portion 404-2 coupled to a stem locking plate (406a, 406b). In some examples, the stem locking plate (406a, 406b) may include a flat coin-shaped head (as shown), a rectangular plate, or similar types of flange members.

Figure 23:
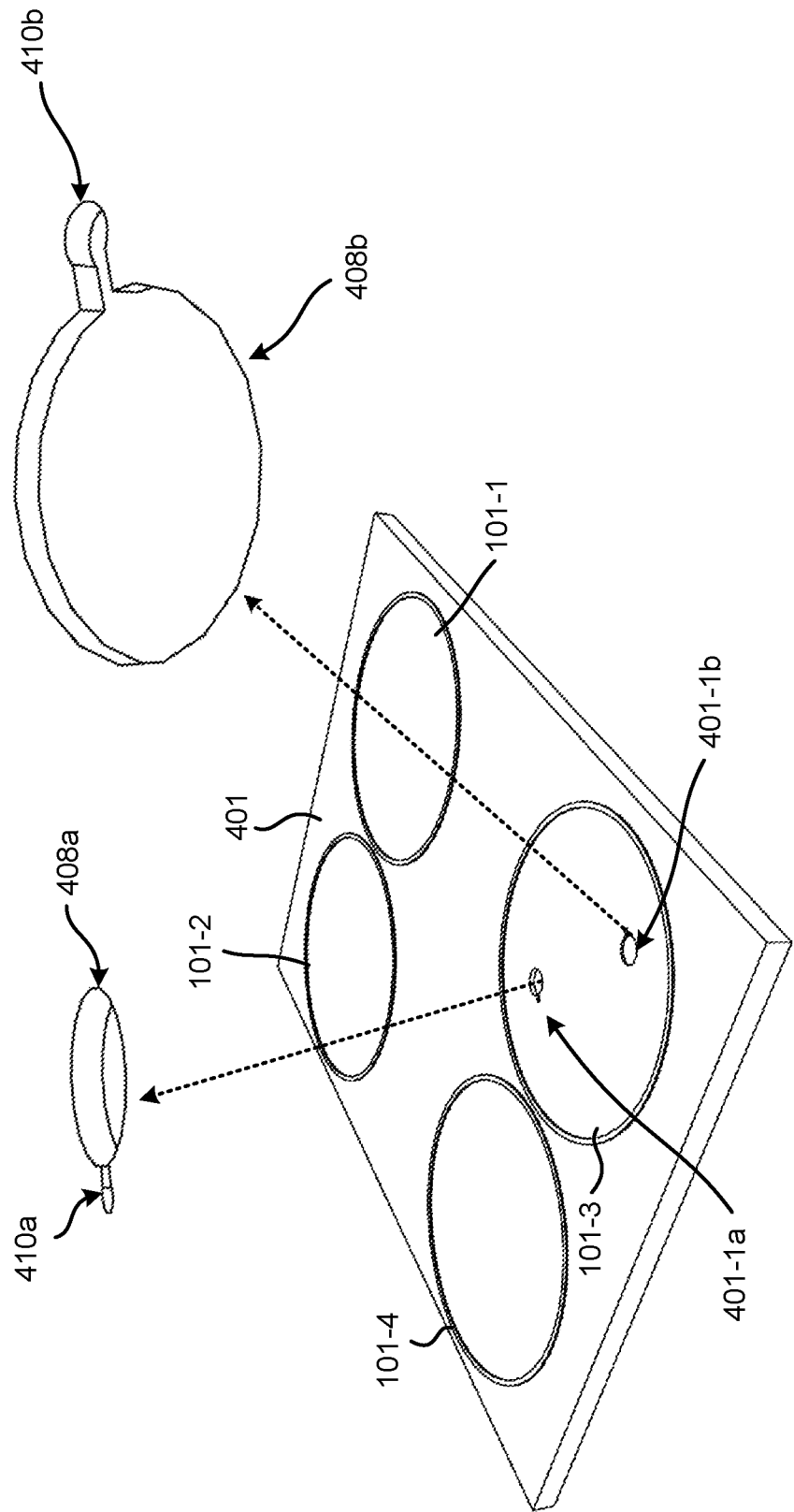
FIG. 23 illustrates a close-up view of a top side view of the safety cooktop having stem locking members disposed near an edge perimeter of the burning station on the electric safety cooktop, according to an embodiment.

FIG. 23 illustrates a close-up view of a top side view of the safety cooktop 401 having stem locking members (401-1a, 401-1b) disposed near an edge perimeter of the burning station 101-3 on the electric safety cooktop 401, according to an embodiment. Each stem locking member (401-1a, 401-1b) may include a keyhole (408a, 408b) for receiving stem locking plates (406a, 406b) and channel inserts (410a, 410b) for receiving a portion of the stem body (404a, 404b) when inserted and rotated therein. In addition, each stem locking member (401-1a, 401-1b) may be configured to be structurally formed into the surface of the safety cooktop 401, being made planar and flushed to its surface. In practice, each stem locking member (401-1a, 401-1b) provides a main opening and locking slot when the safety stem members (402-1a, 402-1b) are inserted therein. In other implementations, the stem locking member (401-1a, 401-1b) may include other design structures such as tapered slots, zig-zag slots, u-slots, and other types of meandering slots configurations supporting and fastening to a portion of the stem body (404a, 404b). In another implementation, a reinforcement plate may encompass the stem locking member (401-1a, 401-1b), providing additional strength and support to the surface of the safety cooktop 401.

Figure 24B:
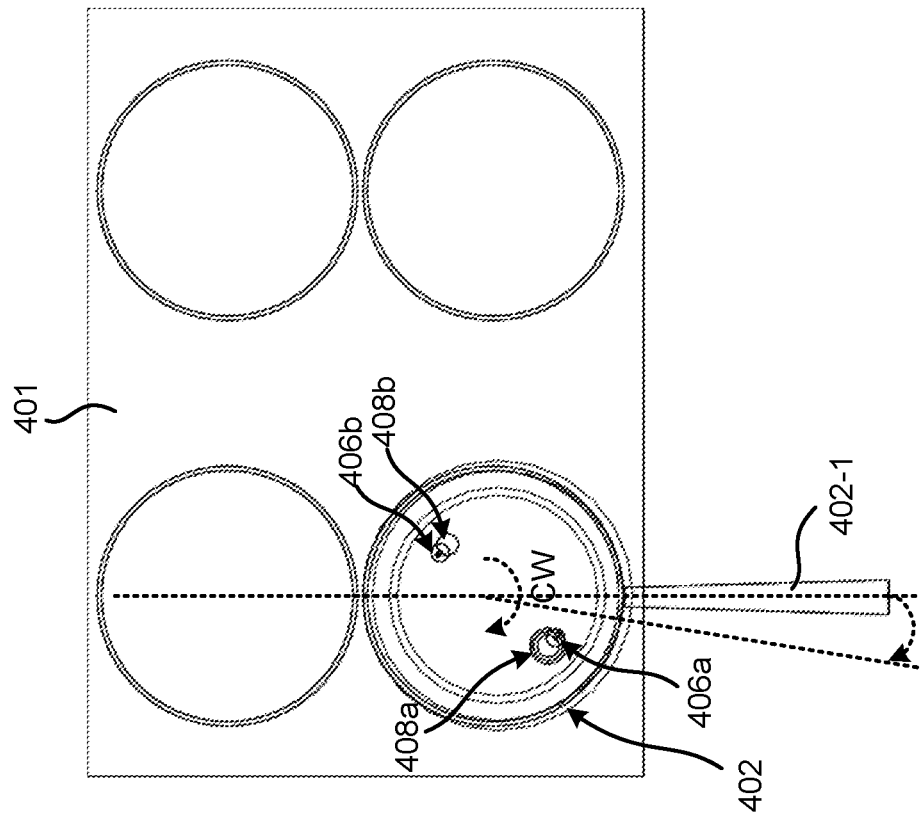
FIG. 24A-FIG. 24B illustrate top views of the safety cooktop with the safety cooking vessel in an unlocked position and locked position, according to an embodiment.
Figure 24A:
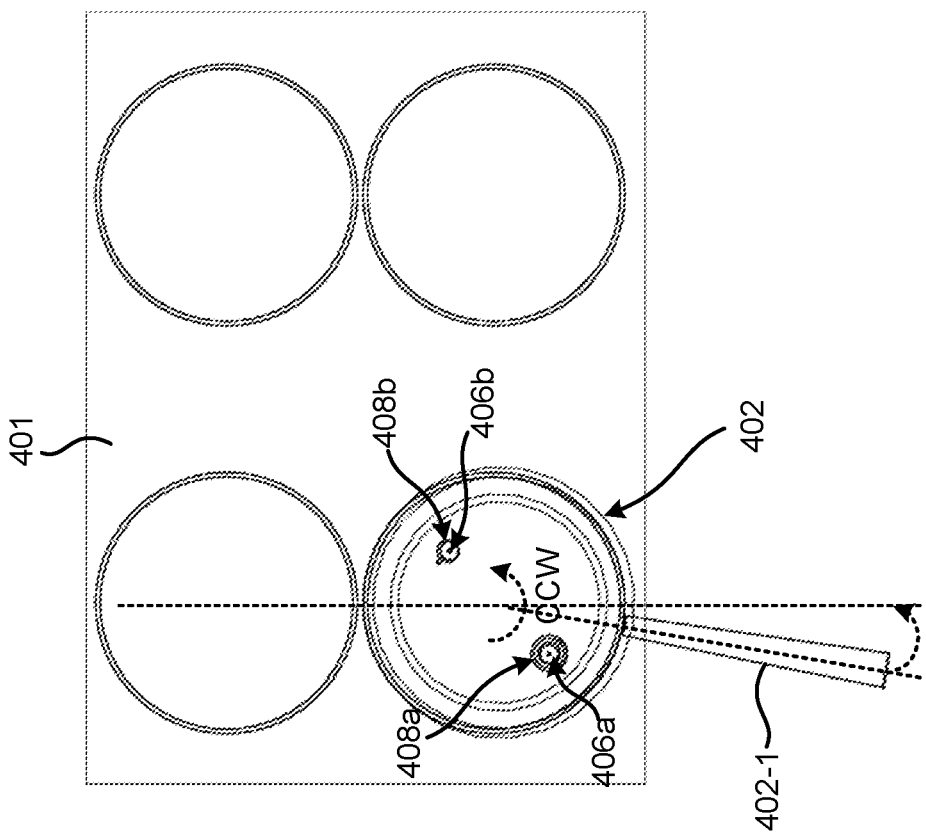

FIG. 24A-FIG. 24B illustrate top views of the safety cooktop 401 with the safety cooking vessel 402 in an unlocked position (FIG. 24A) and locked position (FIG. 24B), according to an embodiment. In FIG. 24A, the stem locking plates (406a, 406b) of the safety cooking vessel 402 are aligned and directly inserted into keyholes (408a, 408b) of the safety cooktop 401. The safety cooking vessel 402 remains unlocked when initially inserted and rotated in a counter-clockwise direction. After insertion, the safety cooking vessel 402 may be rotated in a clockwise direction to engage the portion of the stem bodies (404a, 404b) into channel insert 410, thereby locking stem locking plates (406a, 406b) to the safety cooktop 401 via stem locking plates (406a, 406b).

Figure 25:
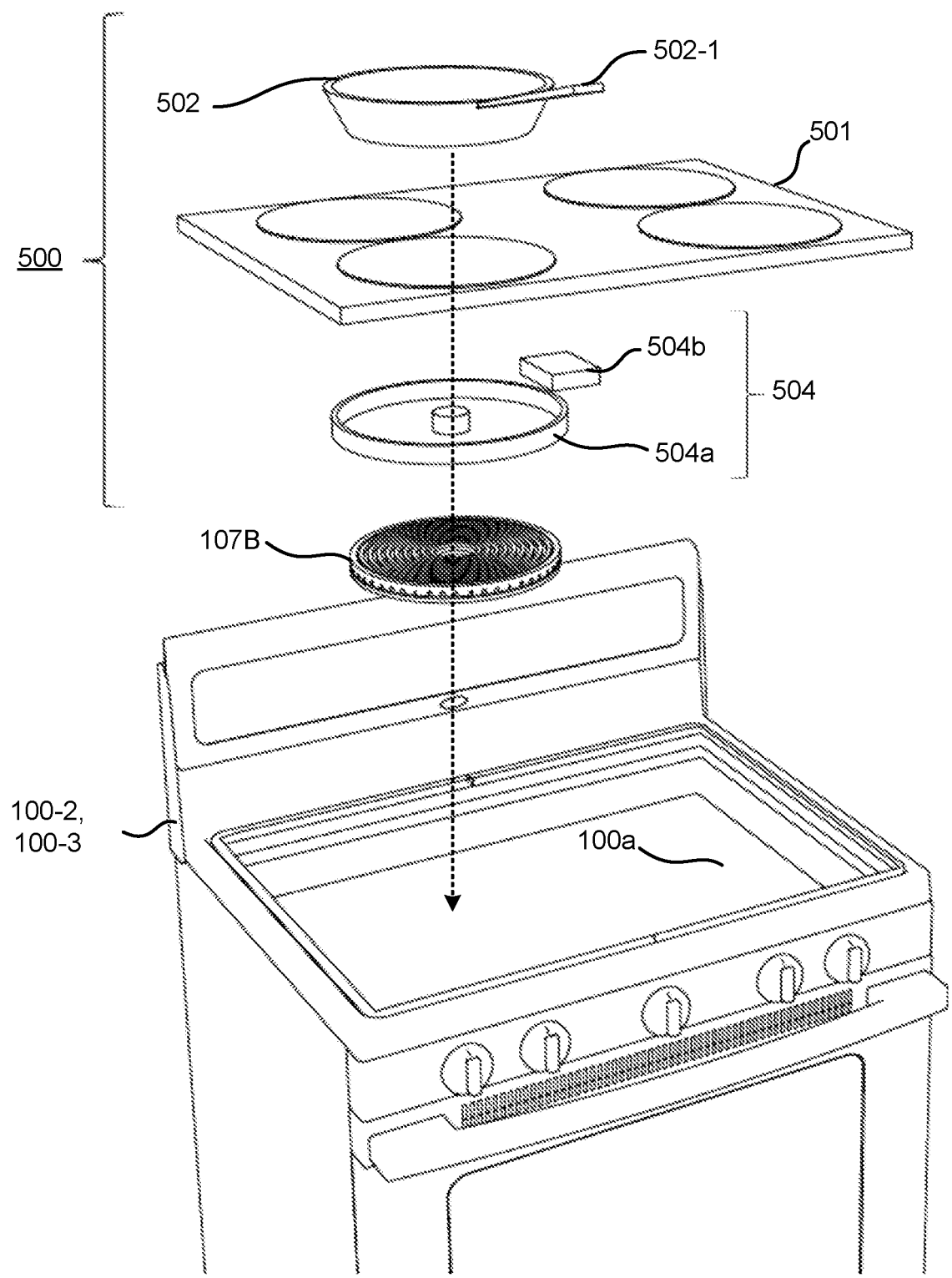
FIG. 25 illustrates a front-side exploded view of an electric cooktop safety system having magnetic fastening component applied to the electric ranges, according to an embodiment.

FIG. 25 illustrates a front-side exploded view of an electric cooktop safety system 500 having magnetic fastening components applied to the electric ranges 100-2 or 100-3, according to an embodiment. The electric cooktop safety system 500 may include a safety cooking vessel 502 (including an optional handle 502-1) made of, or contain, a ferrous metal such as cast iron or some stainless steels, a safety cooktop 501 disposed above a top portion of the electric range (100-2 or 100-3), and an electro-magnetic assembly 504 disposed underneath the safety cooktop 501. The electro-magnetic assembly 504 may include an electro-magnetic core 504a that is powered by a controller 504b, thereby generating a powerful magnetic field when electric current is supplied to the electro-magnetic core 504a. In one implementation, the electromagnet core 504a may include a wire wound into a coil. In operation, the magnetic field is actuated when the electric current is applied to the coil and disabled when the current is turned off. The magnetic core may be made from a ferromagnetic material such as iron or steel.

Figure 26B:
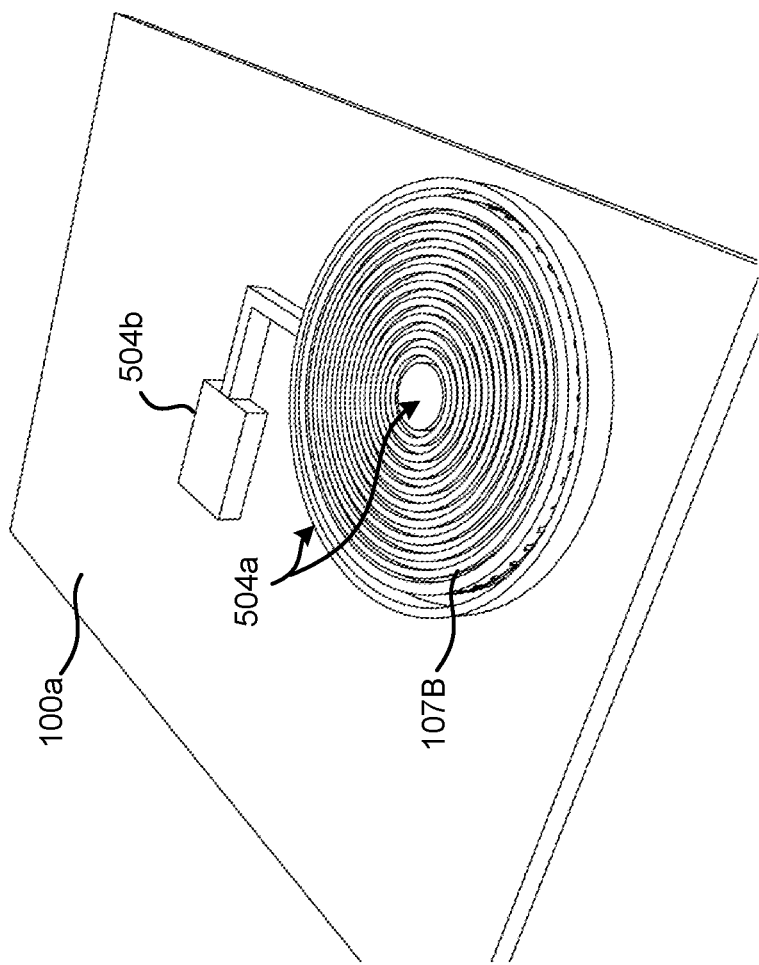
FIG. 26A-FIG. 26B illustrate a top view and a perspective view of the electro-magnetic assembly, according to an embodiment.
Figure 26A:
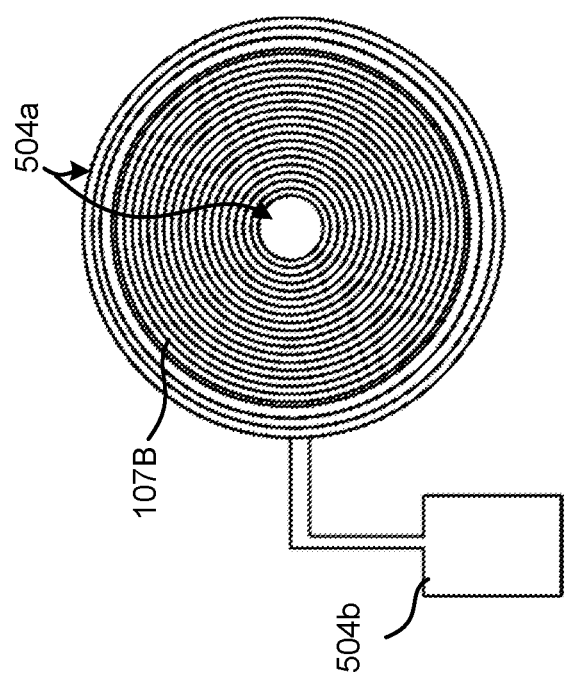

FIG. 26A-FIG. 26B illustrate a top view and a perspective view of the electro-magnetic assembly 504, according to an embodiment. In this implementation, the electro-magnetic core 504a may include an inner core which is underneath the disposed in near the center of the internal burning element 107B and an outer core which encompasses the internal burning element 107B. Both the electro-magnetic assembly 504 and the internal burning element 107B are electromagnetically coupled to the safety cooktop 501 from an underside portion of the safety cooktop 501.

FIG. 27A-FIG. 27B illustrate a top view and a perspective view of the electro-magnetic core 504a embedded into the safety cooktop 501 of the electric range (100-2 or 100-3), according to an embodiment. In this implementation, the electro-magnetic core 504a may be integrated and embedded into the safety cooktop 501 instead of being disposed underneath it as presented in the previous example. In addition, the electro-magnetic core 504a may be about the same thickness as the safety cooktop 501, thereby allowing it to be flushed and planar to the top surface of the safety cooktop 501. Having the electro-magnetic core 504a embedded into the cooktop 501 provides direct metal surface-to-surface contact to the cooking vessel 502 when placed thereon, allowing a stronger magnetic attraction between the electro-magnetic core 504a and the metal cooking vessel 502.

Figure 28A:
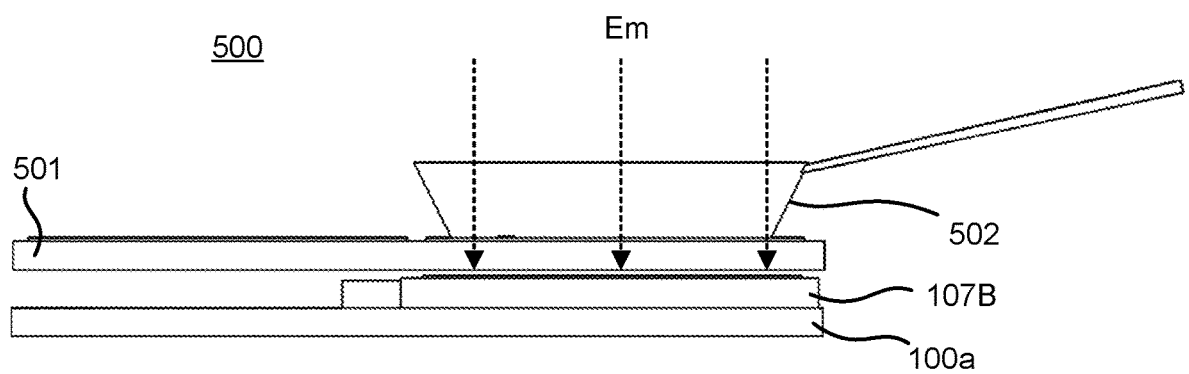
FIG. 28A-FIG. 28B illustrate a side view and a perspective view of the safety cooking vessel secured to the cooktop by the electro-magnetic assembly, according to an embodiment.
Figure 28B:
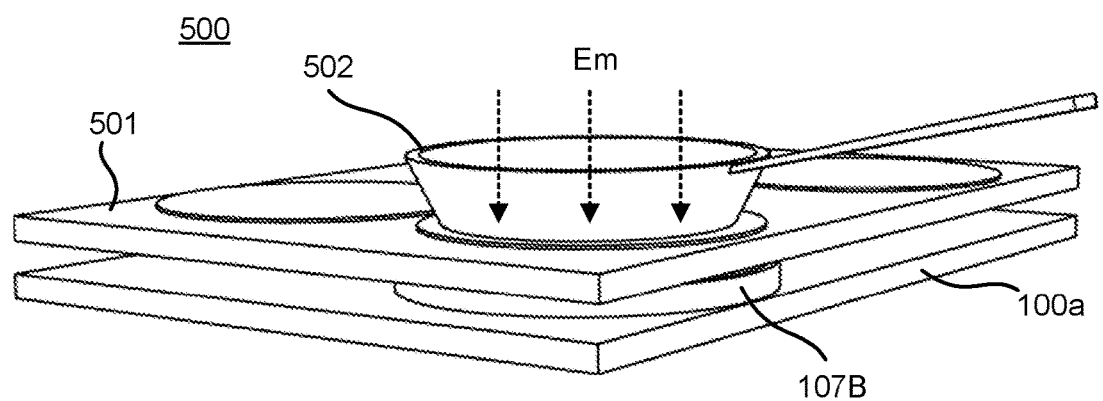

FIG. 28A-FIG. 28B illustrate a side view and a perspective view of the safety cooking vessel 502 secured to the safety cooktop 501 by the electro-magnetic assembly 504, according to an embodiment. A bottom outer surface of the safety cooking vessel 502 sits flushed against a top planar surface of the safety cooktop 501 when placed thereon. When the electro-magnetic assembly 504 is enabled via an on/off switch of the controller 504b, an electro-magnetic field Em is generated which magnetically secures the cooking vessel 502 to the safety cooktop 501, thereby preventing the cooking vessel 502 from being pulled off, tipping over, or falling off the electric range 100-2 or 100-3. In another example, the electro-magnetic assembly 504 is automatically enabled via a motion sensor or proximity sensor disposed within the safety cooktop 501 after the safety cooking vessel 502 is placed on the safety cooktop 501. In another implementation, the motion sensor or proximity sensor may be controlled by a timer which enables the electro-magnetic assembly 504 after a predetermined time period.

In the embodiments presented above, the number of cooking vessels and safety fastening components (e.g., safety stem and stem locking members) are not so limited to a single burning station, but may preferably be applied to any number of multiple burning stations (101-1 to 101-4) on the electric cooktop.

As used in the specification and the appended claims, the singular forms "a", "an", and "the" included plural referents unless the context clearly dictates otherwise.

The foregoing disclosure has been provided merely for the purpose of explanation and is in no way to be construed as limiting of the present disclosure. Although the present disclosure has been shown and described with respect to several preferred embodiments thereof, various changes, omissions, and additions to the form and detail thereof, may be made therein, without departing from the spirit and scope of the disclosure. It is understood that the words which have been used herein are words of description and illustration, rather than words of limitation. Changes may be made, within the purview of the appended claims, as presently stated and as amended, without departing from the scope and spirit of the present disclosure in its aspects.

Other embodiments and modifications of the present disclosure may occur to those of ordinary skill in the art in view of these teachings. Accordingly, the disclosure is to be limited only by the following claims which include all other such embodiments and modifications when viewed in conjunction with the above specifications and accompanying drawings.

What is claimed is:

1. An electric cooktop safety system comprising:
   a safety cooking vessel having a safety stem coupled to a bottom portion of the safety cooking vessel, wherein the safety stem includes a stem body, a first keyed member disposed along a first end of the stem body, and a second keyed member disposed along a second end of the stem body; and
   a safety cooktop of an electric range having a bottom stem locking member disposed within a topside portion of the safety cooktop, wherein the second keyed member is detachably coupled to the bottom stem locking member, preventing the safety cooking vessel from tipping over when the second keyed member is fastened to the bottom stem locking member.

2. The electric cooktop safety system of claim 1, wherein the safety cooking vessel includes a top stem locking member disposed on the bottom portion of the safety cooking vessel, wherein the first keyed member is detachably coupled to the top stem locking member.

3. The electric cooktop safety system of claim 2, wherein the first keyed member is unlocked from the top stem locking member when the safety stem is rotated in a first direction, and is locked to the top stem locking member when the safety stem is rotated in a second direction.

4. The electric cooktop safety system of claim 2, wherein the top stem locking member includes a first opening disposed in the bottom portion of the safety cooking vessel, and the bottom stem locking member includes a second opening disposed the topside portion of the safety cooktop.

5. The electric cooktop safety system of claim 4, the first opening and the first keyed member are complementary in shape, and the second opening and the second keyed member are complementary in shape.

6. The electric cooktop safety system of claim 2, wherein the top stem locking member or the bottom stem locking member includes an insert slot having spherical slots disposed along a sidewall of the insert slot.

7. The electric cooktop safety system of claim 2, wherein the top stem locking member or the bottom stem locking member includes an insert slot having elongated keyed slots disposed along a sidewall of the insert slot.

8. The electric cooktop safety system of claim 2, wherein a reinforcement member is coupled to the top stem locking member or the bottom stem locking member.

9. The electric cooktop safety system of claim 1, wherein the safety cooktop is part of the electric range having external heating elements, an electric range having internal heating elements, or an electric induction range.

10. The electric cooktop safety system of claim 1, wherein the safety cooking vessel is made from cast iron, copper, stainless steel, or aluminum.

11. The electric cooktop safety system of claim 1, wherein the first keyed member and the second keyed member have one or more protruding ridges or teeth-like structures.

12. The electric cooktop safety system of claim 1, wherein each of said one or more protruding ridge is equally distributed along an outer edge of the safety stem.

13. The electric cooktop safety system of claim 1, wherein the first keyed member or the second keyed member includes one or more spring-loaded ball locking fasteners and a quick-release lever for unlocking and locking the one or more spring-loaded ball locking fasteners.

14. The electric cooktop safety system of claim 1, wherein the first keyed member or the second keyed member includes one or more spring-loaded teeth-like locking fasteners and a quick-release lever for unlocking and locking the one or more spring-loaded teeth-like locking fasteners.

15. The electric cooktop safety system of claim 1, wherein the stem body includes a bar, a rod, or other elongated shaped rigid bodies.

16. A safety cooking vessel for cooking food on an electric range comprising:
a cooking body having at least a cookware surface, a bottom portion, and a handle;
a safety stem coupled to the bottom portion of the cooking body, wherein the safety stem includes a stem body, a first keyed member disposed along a first end of the stem body, and a second keyed member disposed along a second end of the stem body, wherein the second keyed member engages with a bottom stem locking member configured to be disposed within a safety cooktop of the electric range, preventing the safety cooking vessel from tipping over when the second keyed member is fastened to the bottom stem locking member
wherein the safety cooking vessel includes a top stem locking member disposed on the bottom portion of the cooking body, wherein the first keyed member is detachably coupled to the top stem locking member.

17. A safety cooktop of an electric range with a safety cooking vessel comprising:
a planar cooking surface disposed on a top portion of the electric range; a bottom stem locking member disposed within a topside portion of the planar cooking surface, wherein the bottom stem locking member is configured to receive a second keyed member;
the safety cooking vessel;
said safety cooking vessel comprising a cooking body having at least a cookware surface, a bottom portion, and a handle;
a safety stem coupled to the bottom portion of the cooking body, wherein the safety stem includes a stem body, a first keyed member disposed along a first end of the stem body, and the second keyed member disposed along a second end of the stem body, wherein the second keyed member engages with the bottom stem locking member disposed within the safety cooktop of the electric range, preventing the safety cooking vessel from tipping over when the second keyed member is fastened to the bottom stem locking member
wherein the safety cooking vessel includes a top stem locking member disposed on the bottom portion of the cooking body, wherein the first keyed member is detachably coupled to the top stem locking member.

18. The safety cooktop of claim 17, wherein the second keyed member prevents the safety cooking vessel from tipping over when the second keyed member is fastened to the bottom stem locking member.

19. The safety cooktop of claim 17, wherein the electric range includes external heating elements, or internal heating elements, or the electric range is an electric induction range.

* * * * *